(12) United States Patent
Brun et al.

(10) Patent No.: US 11,295,135 B2
(45) Date of Patent: Apr. 5, 2022

(54) ASSET TRACKING OF COMMUNICATION EQUIPMENT VIA MIXED REALITY BASED LABELING

(71) Applicant: CORNING RESEARCH & DEVELOPMENT CORPORATION, Corning, NY (US)

(72) Inventors: Quentin Brun, Sendets (FR); Benoit Courchesne, Laval (CA); Jeremie Georges Gerard Petitjean, Denguin (FR); Peter Gerard Wigley, Corning, NY (US)

(73) Assignee: Corning Research & Development Corporation, Corning, NY (US)

( * ) Notice: Subject to any disclaimer, the term of this patent is extended or adjusted under 35 U.S.C. 154(b) by 0 days.

(21) Appl. No.: 17/172,752

(22) Filed: Feb. 10, 2021

(65) Prior Publication Data

US 2021/0374406 A1    Dec. 2, 2021

Related U.S. Application Data

(60) Provisional application No. 63/115,785, filed on Nov. 19, 2020, provisional application No. 63/031,624, filed on May 29, 2020.

(51) Int. Cl.
*G06K 9/00* (2006.01)
*H04L 41/082* (2022.01)
(Continued)

(52) U.S. Cl.
CPC ... *G06K 9/00671* (2013.01); *G06F 16/24569* (2019.01); *G06T 19/006* (2013.01); *H04L 41/082* (2013.01)

(58) Field of Classification Search
CPC ... G06T 19/006; G06T 19/20; G06K 9/00664; G06K 9/00671; G06K 9/0084;
(Continued)

(56) References Cited

U.S. PATENT DOCUMENTS 5,764,043 A   6/1998   Czosnowski et al.
5,821,510 A   10/1998  Cohen et al.
(Continued)

FOREIGN PATENT DOCUMENTS

CN   102708352 A   10/2012
CN   103454736 A   12/2013
(Continued)

*Primary Examiner* — Charles L Beard
(74) *Attorney, Agent, or Firm* — Grant A. Gildehaus

(57) ABSTRACT

A machine vision system is provided including a camera, a processor, and a device memory including computer program code stored thereon. The computer program code is configured, when executed by the processor, to receive an image, from the camera, including at least one readable digital label associated with communication equipment, determine if an anchor label is present in the image, receive equipment information based on the anchor label and generate a search matrix based on the equipment information and the anchor label The search matrix includes one or more search matrix locations of assets associated with the communication equipment.

24 Claims, 19 Drawing Sheets

(51) Int. Cl.
*G06F 16/245* (2019.01)
*G06T 19/00* (2011.01)

(58) Field of Classification Search
CPC .......... G06K 9/00691; G06K 17/0022; G06K 7/10297; G06K 7/1417; G06F 16/24569; H04L 41/082; G05D 1/0231; G06Q 10/08; G06Q 10/0833; G06Q 10/087; G06Q 10/20
See application file for complete search history.

(56) References Cited

U.S. PATENT DOCUMENTS

| | | | |
|---|---|---|---|
| 6,335,731 B1 * | 1/2002 | Yamamoto | A63F 13/10 345/420 |
| 7,197,214 B2 | 3/2007 | Elkins et al. | |
| 7,547,150 B2 | 6/2009 | Downie et al. | |
| 7,667,574 B2 | 2/2010 | Downie et al. | |
| 7,726,144 B2 * | 6/2010 | Larson | H01L 23/34 62/259.2 |
| 7,756,667 B2 * | 7/2010 | Hamann | G01K 1/026 702/130 |
| 7,772,975 B2 | 8/2010 | Downie et al. | |
| 7,782,202 B2 | 8/2010 | Downie et al. | |
| 7,855,697 B2 | 12/2010 | Chamarti et al. | |
| 7,965,186 B2 | 6/2011 | Downie et al. | |
| 8,138,925 B2 * | 3/2012 | Downie | G06K 19/0723 340/572.8 |
| 8,172,468 B2 | 5/2012 | Jones et al. | |
| 8,248,208 B2 * | 8/2012 | Renfro, Jr. | G06K 19/07707 340/10.1 |
| 8,264,355 B2 | 9/2012 | Kozischek et al. | |
| 8,410,909 B2 | 4/2013 | De Jong | |
| 8,421,626 B2 | 4/2013 | Downie et al. | |
| 8,556,163 B2 | 10/2013 | Wu et al. | |
| 8,639,482 B2 * | 1/2014 | Rasmussen | H05K 7/20836 703/5 |
| 8,665,333 B1 * | 3/2014 | Sharma | G08B 13/19643 348/159 |
| 8,681,179 B2 * | 3/2014 | Rolleston | G06T 19/006 345/633 |
| 8,731,405 B2 | 5/2014 | Renfro et al. | |
| 8,738,754 B2 * | 5/2014 | Windell | G06F 11/0751 709/223 |
| 8,803,660 B2 * | 8/2014 | Martin | G08C 21/00 340/10.1 |
| 8,817,047 B1 * | 8/2014 | Lee | G09G 3/003 345/633 |
| 8,913,086 B2 * | 12/2014 | Meserth | G06F 11/07 345/633 |
| 8,957,917 B2 * | 2/2015 | Meserth | G06F 16/583 345/633 |
| 9,013,550 B2 * | 4/2015 | Jiang | G06T 7/74 348/46 |
| 9,064,022 B2 * | 6/2015 | Smith | G06F 16/955 |
| 9,092,865 B2 * | 7/2015 | Chudy | G06K 9/00671 |
| 9,098,986 B2 * | 8/2015 | Capozella | G08B 5/36 |
| 9,120,622 B1 * | 9/2015 | Elazary | B25J 15/0608 |
| 9,147,379 B2 * | 9/2015 | Deffeyes | G09G 5/377 |
| 9,171,209 B2 * | 10/2015 | Townend | G06Q 10/08 |
| 9,172,465 B2 | 10/2015 | Wu et al. | |
| 9,210,049 B2 * | 12/2015 | Polland | H04L 41/24 |
| 9,235,824 B2 * | 1/2016 | Martin | G06Q 10/087 |
| 9,361,733 B2 * | 6/2016 | Lee | G09G 3/003 |
| 9,443,221 B2 * | 9/2016 | Chudy | H04N 7/183 |
| 9,461,737 B2 * | 10/2016 | Wu | H04B 10/077 |
| 9,467,335 B2 | 10/2016 | Weng et al. | |
| 9,552,674 B1 * | 1/2017 | Jayadevaprakash | G06F 3/011 |
| 9,576,329 B2 * | 2/2017 | Frankel | G06Q 50/2057 |
| 9,613,383 B2 * | 4/2017 | Yoon | G06Q 50/06 |
| 9,712,237 B2 | 7/2017 | Wu et al. | |
| 9,779,517 B2 * | 10/2017 | Ballard | G06T 11/00 |
| 9,781,170 B2 * | 10/2017 | Denker | H04L 51/32 |
| 9,805,262 B2 * | 10/2017 | Kimura | G06K 9/00671 |
| 9,824,474 B2 * | 11/2017 | Smith | G09G 5/377 |
| 9,838,844 B2 * | 12/2017 | Emeis | G06T 11/00 |
| 9,846,972 B2 * | 12/2017 | Montgomerie | G06F 40/169 |
| 9,858,482 B2 * | 1/2018 | Perez | G06F 3/011 |
| 9,870,773 B2 * | 1/2018 | German | G06K 9/00671 |
| 9,882,800 B2 * | 1/2018 | Gonzalez Dominguez | H04L 41/5054 |
| 9,882,969 B2 * | 1/2018 | Reddy | G06F 8/61 |
| 9,959,190 B2 * | 5/2018 | Klein | H04L 43/0817 |
| 9,965,564 B2 * | 5/2018 | Whelihan | G06F 16/9554 |
| 9,990,448 B2 * | 6/2018 | Cattoen | G06F 30/13 |
| 9,990,773 B2 * | 6/2018 | Koga | G06T 19/006 |
| 9,996,947 B2 * | 6/2018 | Koga | G06Q 10/0631 |
| 10,049,276 B1 * | 8/2018 | Harper | G06T 11/60 |
| 10,147,398 B2 * | 12/2018 | Koga | G06F 3/04815 |
| 10,163,012 B2 | 12/2018 | Card et al. | |
| 10,168,152 B2 * | 1/2019 | Bender | G06F 30/00 |
| 10,178,130 B2 * | 1/2019 | Apvrille | H04L 63/1416 |
| 10,261,747 B2 * | 4/2019 | Troy | G06F 3/04842 |
| 10,262,656 B2 | 4/2019 | German et al. | |
| 10,297,129 B2 * | 5/2019 | Piccolo, III | G06Q 10/20 |
| 10,332,314 B2 * | 6/2019 | Oar | H04L 41/0866 |
| 10,360,735 B1 * | 7/2019 | Reeder | G06Q 30/016 |
| 10,397,404 B1 * | 8/2019 | Amir | G06F 3/048 |
| 10,403,046 B2 * | 9/2019 | Pinti | G06F 3/011 |
| 10,404,543 B2 * | 9/2019 | Townend | G11B 27/34 |
| 10,423,866 B2 * | 9/2019 | Guionneau | G06Q 10/08 |
| 10,454,575 B2 | 10/2019 | Yin et al. | |
| 10,534,326 B2 * | 1/2020 | Sridharan | G05B 13/04 |
| 10,558,859 B2 | 2/2020 | Harper et al. | |
| 10,593,086 B2 * | 3/2020 | Tham | G06T 11/00 |
| 10,613,729 B2 * | 4/2020 | Cohrt | G06T 19/006 |
| 10,635,423 B2 * | 4/2020 | Newell | G06F 8/65 |
| 10,708,965 B1 * | 7/2020 | Subramanian | G01S 5/0027 |
| 10,715,746 B2 * | 7/2020 | Jhawar | H04N 5/2621 |
| 10,747,281 B1 * | 8/2020 | Trim | H04N 7/181 |
| 10,748,003 B2 * | 8/2020 | Bastide | G06T 7/70 |
| 10,754,494 B2 * | 8/2020 | Duncan | G06F 3/04815 |
| 10,762,470 B2 * | 9/2020 | Soon-Shiong | G06Q 30/06 |
| 10,771,350 B2 * | 9/2020 | Kritzler | G06F 3/014 |
| 10,777,009 B2 * | 9/2020 | Martin | H04L 67/2842 |
| 10,783,410 B1 * | 9/2020 | Hullander | G06K 9/6878 |
| 10,831,588 B2 * | 11/2020 | Qiao | G06F 16/904 |
| 10,846,899 B2 * | 11/2020 | Pokorny | G06F 3/011 |
| 10,860,452 B1 * | 12/2020 | Boeker | G06F 9/5027 |
| 10,878,240 B2 * | 12/2020 | Laycock | G06K 9/2081 |
| 10,878,374 B1 * | 12/2020 | Shi | G06Q 10/087 |
| 10,880,163 B2 * | 12/2020 | Lairsey | H04L 41/0869 |
| 10,885,338 B2 | 1/2021 | Jain et al. | |
| 10,901,721 B2 * | 1/2021 | Mukhopadhyay | G06F 8/65 |
| 10,936,146 B2 * | 3/2021 | Bennett | G06T 19/006 |
| 10,958,765 B1 * | 3/2021 | Sheikh | H04L 67/38 |
| 10,966,342 B2 * | 3/2021 | Lairsey | G06K 9/00671 |
| 10,972,361 B2 * | 4/2021 | Lairsey | G06F 3/0484 |
| 10,977,868 B2 * | 4/2021 | Neeter | G06F 3/011 |
| 10,997,415 B2 * | 5/2021 | Paul | H04L 67/38 |
| 10,997,832 B1 * | 5/2021 | Vadayadiyil Raveendran | G01C 21/206 |
| 11,074,730 B1 * | 7/2021 | Nunez | H04L 41/0654 |
| 2007/0005382 A1 * | 1/2007 | Sayers | G06Q 10/06 715/738 |
| 2007/0238343 A1 * | 10/2007 | Velleca | H01R 9/2475 439/188 |
| 2008/0024392 A1 * | 1/2008 | Gustafsson | G06F 3/013 345/8 |
| 2008/0106377 A1 * | 5/2008 | Flores | G06Q 10/087 340/5.92 |
| 2009/0024764 A1 * | 1/2009 | Atherton | H04L 29/12254 709/250 |
| 2010/0079248 A1 | 4/2010 | Greveling | |
| 2011/0008996 A1 * | 1/2011 | Pinn | H04Q 1/136 439/489 |
| 2011/0043371 A1 * | 2/2011 | German | G06F 13/36 340/815.45 |
| 2011/0153614 A1 * | 6/2011 | Solomon | G06Q 10/087 707/740 |
| 2011/0158478 A1 * | 6/2011 | Yamada | G06F 3/011 382/103 |

(56) References Cited

U.S. PATENT DOCUMENTS

| | | | |
|---|---|---|---|
| 2011/0239056 A1* | 9/2011 | Adams | G06F 11/328 714/48 |
| 2011/0241833 A1* | 10/2011 | Martin | G08C 21/00 340/10.1 |
| 2012/0176516 A1* | 7/2012 | Elmekies | H04N 5/265 348/239 |
| 2012/0249588 A1* | 10/2012 | Tison | G01C 21/206 345/633 |
| 2012/0259973 A1* | 10/2012 | Windell | H04L 41/0686 709/224 |
| 2012/0281509 A1* | 11/2012 | Liang | H04Q 1/136 367/197 |
| 2012/0287936 A1* | 11/2012 | Biswas | H04L 49/70 370/395.3 |
| 2012/0326844 A1 | 12/2012 | Blaignan et al. | |
| 2013/0002717 A1* | 1/2013 | Deffeyes | G06T 19/006 345/633 |
| 2013/0006430 A1* | 1/2013 | Tomiyama | G06Q 20/3276 700/286 |
| 2013/0026220 A1* | 1/2013 | Whelihan | G06F 16/9554 235/375 |
| 2013/0031202 A1* | 1/2013 | Mick | G06F 3/00 709/217 |
| 2013/0038633 A1* | 2/2013 | Maggiore | B01J 19/0033 345/633 |
| 2013/0049976 A1* | 2/2013 | Maggiore | G06T 19/006 340/686.1 |
| 2013/0147839 A1* | 6/2013 | Fukushima | G06Q 30/06 345/633 |
| 2013/0186956 A1* | 7/2013 | Ashok | G06K 7/1417 235/385 |
| 2013/0231779 A1* | 9/2013 | Purkayastha | B25J 9/1697 700/259 |
| 2013/0278635 A1* | 10/2013 | Maggiore | G06F 3/0304 345/633 |
| 2013/0293354 A1 | 11/2013 | Vemagiri et al. | |
| 2013/0299593 A1 | 11/2013 | Glidden III | |
| 2014/0022281 A1* | 1/2014 | Georgeson | G06F 3/1454 345/633 |
| 2014/0061297 A1* | 3/2014 | Smith | H04L 41/0253 235/375 |
| 2014/0092241 A1* | 4/2014 | Brinkman | G06K 9/00671 348/135 |
| 2014/0111346 A1* | 4/2014 | Pinn | H04Q 1/09 340/691.6 |
| 2014/0139405 A1* | 5/2014 | Ribble | A61G 7/002 345/8 |
| 2014/0146038 A1* | 5/2014 | Kangas | G06T 19/20 345/419 |
| 2014/0183254 A1* | 7/2014 | Htay | H04L 41/0806 235/375 |
| 2014/0195666 A1* | 7/2014 | Dumitriu | H04L 41/5038 709/223 |
| 2014/0210947 A1* | 7/2014 | Finn | G06T 19/006 348/46 |
| 2014/0258052 A1* | 9/2014 | Khuti | G06F 16/50 705/28 |
| 2014/0267405 A1* | 9/2014 | Mullins | G06Q 30/02 345/633 |
| 2014/0267419 A1* | 9/2014 | Ballard | G06T 11/00 345/633 |
| 2014/0267792 A1* | 9/2014 | Mullins | H04N 1/00244 348/207.1 |
| 2014/0313364 A1* | 10/2014 | Fan | H04N 5/225 348/222.1 |
| 2015/0006502 A1* | 1/2015 | Chang | G06F 16/24564 707/708 |
| 2015/0032838 A1* | 1/2015 | Demsey | G06F 16/9574 709/213 |
| 2015/0035822 A1* | 2/2015 | Arsan | G06T 19/006 345/419 |
| 2015/0049918 A1* | 2/2015 | Fan | G06T 7/74 382/108 |
| 2015/0146964 A1* | 5/2015 | Tai | G06T 19/20 382/141 |
| 2015/0192774 A1* | 7/2015 | Watanabe | G06Q 10/087 345/8 |
| 2015/0206352 A1* | 7/2015 | Murakami | G06K 9/00671 345/633 |
| 2015/0235425 A1* | 8/2015 | Koga | G06T 19/006 345/633 |
| 2015/0289405 A1* | 10/2015 | Stewart | H05K 7/183 211/26 |
| 2015/0348329 A1* | 12/2015 | Carre | H04N 21/4784 345/633 |
| 2015/0356041 A1* | 12/2015 | Barnur | G06F 13/4022 710/104 |
| 2015/0363076 A1* | 12/2015 | Komatsu | G06F 3/04842 715/765 |
| 2015/0363647 A1* | 12/2015 | Perez | G06F 3/011 345/633 |
| 2016/0012612 A1* | 1/2016 | Koga | G09G 5/397 345/633 |
| 2016/0034761 A1* | 2/2016 | Frankel | G09G 5/003 345/633 |
| 2016/0054791 A1* | 2/2016 | Mullins | G06T 19/006 345/173 |
| 2016/0055674 A1* | 2/2016 | Mullins | G02B 27/017 345/633 |
| 2016/0071319 A1* | 3/2016 | Fallon | G06T 19/006 345/633 |
| 2016/0071325 A1* | 3/2016 | Callaghan | H04W 4/02 345/633 |
| 2016/0124501 A1* | 5/2016 | Lam | G06F 3/048 345/156 |
| 2016/0132532 A1* | 5/2016 | German | G06F 3/167 382/103 |
| 2016/0140370 A1* | 5/2016 | Pierce | G06K 7/10821 235/462.25 |
| 2016/0140868 A1* | 5/2016 | Lovett | G06T 19/006 434/118 |
| 2016/0171773 A1* | 6/2016 | Hara | G06T 19/006 345/633 |
| 2016/0176724 A1* | 6/2016 | Ji | G06T 19/006 700/282 |
| 2016/0217590 A1* | 7/2016 | Mullins | G06T 7/40 |
| 2016/0241743 A1* | 8/2016 | Ozawa | G06K 9/4652 |
| 2016/0253617 A1* | 9/2016 | Truong | G06Q 50/30 705/7.15 |
| 2016/0328883 A1* | 11/2016 | Parfenov | G06T 15/20 |
| 2016/0350595 A1* | 12/2016 | Solomin | G06K 9/6263 |
| 2017/0004382 A1* | 1/2017 | Inoue | G06T 19/006 |
| 2017/0016585 A1* | 1/2017 | Aichang | G08B 21/18 |
| 2017/0034597 A1* | 2/2017 | Shih | H01R 24/64 |
| 2017/0046877 A1* | 2/2017 | Hustad | G09G 5/003 |
| 2017/0091607 A1* | 3/2017 | Emeis | G06T 19/006 |
| 2017/0103290 A1* | 4/2017 | Guionneau | G06K 7/1417 |
| 2017/0213351 A1* | 7/2017 | Lee | A63F 13/213 |
| 2017/0249745 A1* | 8/2017 | Fiala | A63F 13/25 |
| 2017/0251567 A1* | 8/2017 | Naor | H05K 7/20745 |
| 2017/0251945 A1* | 9/2017 | Nick | A61B 5/721 |
| 2017/0263016 A1* | 9/2017 | Nodera | G06T 7/62 |
| 2017/0316621 A1* | 11/2017 | Jefferies | G07B 15/00 |
| 2017/0322705 A1* | 11/2017 | Conway | G06Q 40/08 |
| 2017/0344124 A1* | 11/2017 | Douxchamps | G06F 3/04886 |
| 2018/0029083 A1* | 2/2018 | Farlotti | G06K 9/00442 |
| 2018/0041486 A1* | 2/2018 | Way | H04L 67/02 |
| 2018/0053055 A1* | 2/2018 | Finding | G06T 19/006 |
| 2018/0060264 A1* | 3/2018 | Pinn | G06F 9/44505 |
| 2018/0068158 A1* | 3/2018 | Hiroi | G06K 9/00013 |
| 2018/0077200 A1* | 3/2018 | Aprville | H04L 63/1416 |
| 2018/0139104 A1* | 5/2018 | Seddigh | H04L 41/0213 |
| 2018/0197336 A1* | 7/2018 | Rochford | G06T 19/006 |
| 2018/0249735 A1* | 9/2018 | Espinosa | A23L 3/003 |
| 2018/0341682 A1* | 11/2018 | Shukla | G06F 16/951 |
| 2018/0341811 A1* | 11/2018 | Bendale | G06K 9/3233 |
| 2018/0357827 A1* | 12/2018 | Enssle | H04N 5/23216 |
| 2018/0365495 A1* | 12/2018 | Laycock | G06K 9/46 |

(56) References Cited

U.S. PATENT DOCUMENTS

| | | | |
|---|---|---|---|
| 2019/0019335 A1* | 1/2019 | Elangovan | G06T 7/70 |
| 2019/0026295 A1* | 1/2019 | Maiti | G06F 9/4881 |
| 2019/0041637 A1* | 2/2019 | German | G06K 7/10722 |
| 2019/0052638 A1* | 2/2019 | Agarwal | G07C 3/00 |
| 2019/0057180 A1* | 2/2019 | Bathen | G06T 19/006 |
| 2019/0057181 A1* | 2/2019 | Bathen | G06F 30/17 |
| 2019/0073329 A1* | 3/2019 | Tao | G06F 13/1673 |
| 2019/0080174 A1* | 3/2019 | Harper | H04N 17/04 |
| 2019/0090954 A1* | 3/2019 | Kotian | A61B 34/20 |
| 2019/0122437 A1* | 4/2019 | Pinti | G06K 9/00671 |
| 2019/0149725 A1* | 5/2019 | Adato | H04N 1/32144 348/158 |
| 2019/0156402 A1* | 5/2019 | Greenberger | G06K 9/00671 |
| 2019/0206565 A1* | 7/2019 | Shelton, IV | A61B 34/37 |
| 2019/0220264 A1* | 7/2019 | Yoon | H04L 69/18 |
| 2019/0229870 A1* | 7/2019 | Wu | H04L 5/0094 |
| 2019/0236260 A1* | 8/2019 | Iwamoto | G06F 21/36 |
| 2019/0244008 A1* | 8/2019 | Rivera | G06K 9/00671 |
| 2019/0244436 A1* | 8/2019 | Stansell | G06F 3/011 |
| 2019/0268473 A1* | 8/2019 | Amir | G06T 11/60 |
| 2019/0311525 A1* | 10/2019 | Forsblom | H04W 4/026 |
| 2019/0331288 A1* | 10/2019 | Gupta | A47B 96/021 |
| 2019/0342179 A1* | 11/2019 | Barnard | G06F 16/27 |
| 2019/0355169 A1* | 11/2019 | Sapienza | G06K 9/628 |
| 2019/0362516 A1* | 11/2019 | Suzuki | G06K 9/00671 |
| 2019/0370544 A1* | 12/2019 | Wright, Jr | G06F 3/0488 |
| 2019/0377330 A1* | 12/2019 | Shors | G06T 19/006 |
| 2019/0392216 A1* | 12/2019 | McPeters | G06T 7/70 |
| 2020/0005001 A1* | 1/2020 | Kewitsch | G06K 7/10366 |
| 2020/0051275 A1* | 2/2020 | Karlsson | G09B 19/003 |
| 2020/0074705 A1* | 3/2020 | Berger | G06T 11/60 |
| 2020/0074831 A1* | 3/2020 | Yun | G06T 7/90 |
| 2020/0089952 A1* | 3/2020 | Bastide | H04N 21/25866 |
| 2020/0097429 A1* | 3/2020 | Kiener | H04Q 1/13 |
| 2020/0097726 A1* | 3/2020 | Gurule | H04N 21/84 |
| 2020/0098457 A1* | 3/2020 | Naygauz | G16H 20/10 |
| 2020/0134291 A1* | 4/2020 | Kim | F25D 11/00 |
| 2020/0136356 A1 | 4/2020 | Schall et al. | |
| 2020/0137918 A1* | 4/2020 | Takisaki | H04N 19/17 |
| 2020/0145495 A1* | 5/2020 | Coffey | H04L 67/125 |
| 2020/0151450 A1* | 5/2020 | Hishinuma | G06T 7/74 |
| 2020/0160607 A1* | 5/2020 | Kjallstrom | G06F 3/017 |
| 2020/0175765 A1* | 6/2020 | McAdam | G06T 7/73 |
| 2020/0197107 A1* | 6/2020 | Ryan | A61B 90/361 |
| 2020/0252276 A1* | 8/2020 | Lairsey | G06T 19/006 |
| 2020/0257566 A1* | 8/2020 | Ganguli | G06F 1/20 |
| 2020/0275174 A1 | 8/2020 | Qi et al. | |
| 2020/0302510 A1* | 9/2020 | Chachek | H04W 4/021 |
| 2020/0334877 A1* | 10/2020 | Pokorny | G06K 9/00664 |
| 2020/0348662 A1* | 11/2020 | Cella | G05B 23/0229 |
| 2020/0372253 A1* | 11/2020 | Jain | G06K 9/2063 |
| 2020/0396418 A1* | 12/2020 | Fink | G06K 9/46 |
| 2020/0401209 A1* | 12/2020 | Boss | G06F 3/011 |
| 2021/0035358 A1* | 2/2021 | King | G06T 17/05 |
| 2021/0058167 A1 | 2/2021 | Sheehe et al. | |
| 2021/0072114 A1* | 3/2021 | Tosik | G02B 6/385 |
| 2021/0072877 A1* | 3/2021 | Kim | G06T 19/006 |
| 2021/0083992 A1* | 3/2021 | Didear | H04W 4/80 |
| 2021/0084119 A1* | 3/2021 | Sheikh | G06T 19/20 |
| 2021/0174371 A1* | 6/2021 | Yoffe | G06Q 10/20 |
| 2021/0194821 A1* | 6/2021 | Guim Bernat | H04L 47/823 |
| 2021/0232154 A1* | 7/2021 | Kewitsch | G02B 6/3895 |
| 2021/0279437 A1* | 9/2021 | Marley | G06K 7/1413 |
| 2021/0366092 A1* | 11/2021 | Venkatraman | G06T 7/001 |

FOREIGN PATENT DOCUMENTS

| | | |
|---|---|---|
| CN | 111999819 A | 11/2020 |
| CN | 111999820 A | 11/2020 |
| CN | 112311588 A | 2/2021 |
| EP | 3258621 A1 | 12/2017 |
| GB | 2499245 A | 8/2013 |
| JP | 2007-221400 A | 8/2007 |
| KR | 10-2016-0113507 A | 9/2016 |
| KR | 10-2188314 B1 | 12/2020 |
| WO | 2013/165974 A1 | 11/2013 |
| WO | 2013/173122 A1 | 11/2013 |
| WO | 2014/058784 A2 | 4/2014 |

* cited by examiner

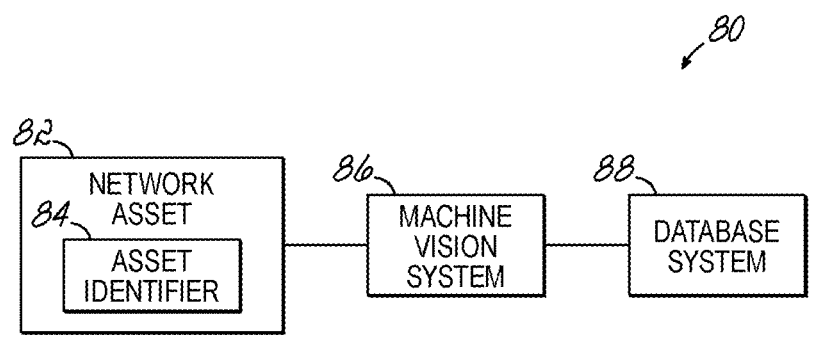
FIG. 5
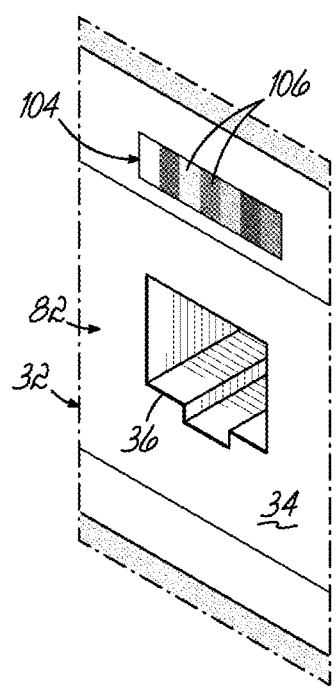 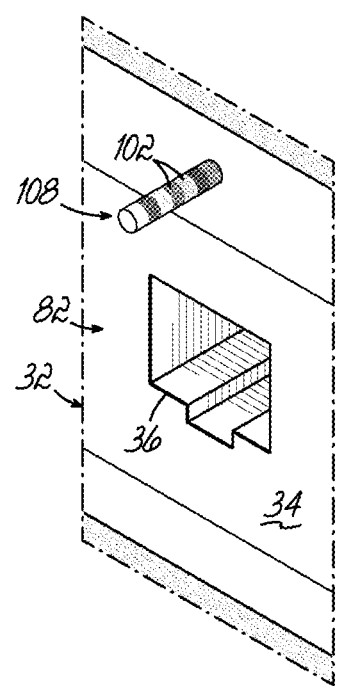
FIG. 7A   FIG. 7B

ASSET TRACKING OF COMMUNICATION EQUIPMENT VIA MIXED REALITY BASED LABELING

CROSS-REFERENCE TO RELATED APPLICATIONS

The present application claims priority under 35 U.S.C. § 119(e) to U.S. Provisional Patent Application Ser. No. 63/031,624 entitled "Systems and Methods for Digital Trackability of Network Components in a Data Network," filed on May 29, 2020; and U.S. Provisional Patent Application No. 63/115,785 entitled "Automated Logging of Patching operations via Mixed Reality Based Labeling," filed Nov. 19, 2020, both of which are incorporated herein by reference in their entirety.

TECHNICAL FIELD

This disclosure relates generally to optical connectivity, and more particularly to systems and methods for digitally tracking components in a network to enhance the physical layer knowledge of network components and their connectivity, and thereby enhance various installation, maintenance, upgrade, and/or de-commissioning operations associated with the network.

BACKGROUND

The large growth of the Internet has led businesses and other organizations to develop large scale data centers for organizing, processing, storing and/or disseminating large amounts of data. Data centers contain a wide range of information technology (IT) equipment including, for example, servers, networking switches, routers, storage systems, etc. Data centers further include a large amount of cabling and racks to organize and interconnect the IT equipment in the data center. Modern data centers may include multi-building campuses having, for example, one primary or main building and a number of auxiliary buildings in close proximity to the main building. IT equipment in the buildings on the campus is typically interconnected by one or more local fiber optic networks.

In order to organize the IT equipment in the data center, the buildings on the campus are typically divided into rooms or other identifiable physical spaces. Each room may then include multiple racks that are arranged in identifiable rows within the room. Each of the racks may then be further divided into housings/frames/shelves which hold the IT equipment. Each piece of IT equipment may include one or more ports for providing a data connection to another piece of IT equipment to form a network. For example, the racks may include a plurality of patch panels, each having a plurality of ports for making connections with other ports. Thus, the physical location of various ports in the data center may be designated by building, room, row, rack, housing/frame/shelf, panel, and finally port.

In an operational data center, connections are made between various ports of patch panels in order to connect different aspects of the data network. These connections may be made, for example, with a fiber optic or copper wire patch cord, which typically includes a length of fiber optic or copper wire cable terminated at both ends with a connector. The connectors of the patch cord are then inserted into certain ports in designated patch panels to achieve a desired connection between the IT equipment. Due to the very large number of connections and patch cords associated with a data center, the patch cords will generally be organized by routing the cords along the racks so as to extend generally vertically (e.g., upwardly) and along generally open raceways positioned above the racks. Such raceways provide a pathway for the patch cord to extend between two desired ports on different patch panels within a room or different rooms, for example.

During a greenfield installation in a data center, attempts are normally made to track the physical location of patch cords and create a log for tracking what ports the connectors of the patch cords are connected to. This information provides a description of the physical network structure referred to as the physical layer. The creation of a log with network components, their location, their connectivity in the data center, and their routing (if applicable), however, lacks standardization and is often done by various ad hoc approaches. As a result, in many cases, these logs are inaccessible (e.g., lost or misplaced), indecipherable (e.g., unreadable or uninterpretable), and/or incomplete (e.g., only a partial record or no record was ever made). For example, in one approach, the connectors of the patch cords may be labeled with an alphanumeric identifier, such as on a piece of tape wrapped around the cable adjacent its ends, or a barcode such as a one-dimensional, two-dimensional, or quick response (QR) code. Then, when a patch cord is inserted into a specific port in a patch panel in the data center, the connector identifier and a port identifier is manually logged into computer based spreadsheet, or paper-based records, such as a log book or 3-ring binder. This approach is sometimes referred to as "label and table".

Such an approach, however, has many drawbacks. For starters, the manual entry of codes in a log is subject to human error. More particularly, the entries may have errors in the alphanumeric identifier and/or be difficult to decipher and interpret. Additionally, in some cases the tape or other ad hoc label may become separated from its patch cord or port, making a positive identification of a cable or port difficult, if not impossible. Furthermore, the original logs that record the physical location of the patch cords and data connections may over time become lost and/or unreliable. For example, in many cases the logs will not be updated during maintenance and/or upgrade operations. Thus, the logs may no longer provide an accurate and reliable indication of the physical location of network components and connections. Moreover, in many cases the installation of data centers is conducted on an accelerated schedule such that logs of the various network components and their physical connections in the data center architecture are simply not made at all. For one or more of these reasons, knowledge of the physical layer may be lacking.

The lack of an accurate physical layer log is problematic for several reasons. For example, various moves, additions, and changes in the data network, such as by maintenance, expansion, upgrade, or de-commissioning operations in the network, are a costly and time-consuming process. More particularly, data centers provide network services that impact a large number of customers. For instance, breakage or misconnection of patch cords in a data center may result in traffic interruption that affects a large number (e.g., millions) of end users. This in turn results in lost service, lost revenue, and frustrated and dissatisfied customers. Additionally, the traffic passing through a data center may include sensitive and high-value information that necessitates an extra layer of care to avoid errors, outages, or interruptions. Thus, a high level of care and competency is generally required when conducting changes in the physical layer of a data center.

The lack of available and accurate records of the physical layer complicates various network procedures, such as maintenance, upgrades, or de-commissioning operations. For example, considerable time and effort must be expended to effectively re-map the physical layer (e.g., the impacted patch cords, connectors, and ports) to ensure that changes in accordance with these procedures are done accurately and without loss of service to customers and end users. Accordingly, these processes are time and labor intensive, and generally increase the overall costs of the network change. In many cases, even if accurate records are available, network technicians responsible for maintenance or upgrade operations will avoid the risks associated relying on these records by installing new patch cords or other network components to achieve the maintenance or upgrade. This, however, is inefficient and also results in a generally costly and excessively congested process. Moreover, this further complicates the physical layer with additional network components and connections that are not generally recorded in the logs, in the event a log even exists. Accordingly, subsequent maintenance, upgrade, and de-commissioning operations may be even further complicated by inaccurate records of changes to the physical layer made during these operations.

The issues associated with a lack of trustworthy physical layer records occur not only with large data centers, but also occur in other areas of a distributed data network, such as a carrier network. For example, to meet modern demands for increased bandwidth and improved performance, carrier networks are increasingly providing optical fiber connectivity closer to end subscribers. These initiatives include fiber-to-the-node (FTTN), fiber-to-the-premises (FTTP), fiber-to-the-home (FTTH), fiber-to-the-antenna (FTTA), and the like (generally described as FTTx). In an FTTx network, for example, fiber optic cables are used to carry optical signals from a central location, such as a central office, to various distribution points and, in some cases, all the way to end subscribers. In many carrier networks, drop cables from subscriber premises are routed to a remote distribution point in the vicinity of the subscriber premises. The drop cables are then selectively connected to ports in the remote distribution point to achieve a connection with a desired service provider (e.g., phone, television, internet connectivity).

There are many different network architectures, and the various tasks required to distribute optical signals (e.g., splitting, splicing, routing, connecting subscribers) can occur at several locations. Regardless of whether a location is considered a local convergence point, network access point, demarcation point, or something else, network equipment is used to house components that carry out one or more of the tasks. The term "distribution point" will be used in this disclosure to generically refer to such equipment, which may include fiber distribution hubs (FDH), cabinets, closures, network interface devices, concentrators, multiplexers, distribution frames, local convergence cabinets, etc. Patch cords or other fiber optic cables may be used to make connections between various ports in a distribution point. Depending on the location where the distribution point is used in the carrier network, there may be hundreds of such connectors and ports in the distribution point.

As such, distribution points of a carrier network oftentimes suffer from the same drawbacks as connectors and ports in a data center, i.e., a log of the physical layer is often inaccessible, undecipherable, and/or incomplete. Accordingly, when a service technician accesses a distribution point to make a desired connection, in accordance with a work order, for example, there may be some uncertainty regarding the physical location of the distribution point associated with the work order, or whether the connectors and ports in the distribution point are being properly identified and connected. Of course, if the wrong connection is made, service to the end subscribers is interrupted or delayed and results in customer frustration and dissatisfaction. In many cases, the connections are being done by third-party contractors that are paid merely by the number of connections performed. Such an arrangement may promote errors, a lack of attention to good record keeping, and a lack transparency and accountability for when errors are made. Additionally, to correct the connection error, a service technician has to make a return trip to the distribution point to make the proper connection. Such return trips represent lost time and revenue and are generally costly to the service provider.

There have been some attempts to address cable management and connectively in various aspects of a data network through an automated approach. For example, radio frequency identification (RFID), near field communication (NFC) or other asset management tools have been used in some cases. These approaches, however, have generally failed to gain traction in the industry due to various reasons, including the incremental hardware costs associated with the tags and antennas required for these wireless technologies, the increased cost and complexity of the network infrastructure, the significant departure from current best practices and approaches, and a lack of robustness to the overall tracking system. Additionally, these approaches typically perform object recognition from more of a macro scale, and therefore may fail to differentiate between separate network components or parts when there are numerous tags/readers in very compact spaces, as is often the case in data center architectures and in distribution points of carrier networks, for example.

Based on the above, network service providers desire an improved approach for providing accurate information on the physical structure of data networks, whether that be within the context of a large data center, in a distribution point of a carrier network, or in a different aspect of the data network, where knowledge of the physical structure may prove beneficial. More particularly, there is a desire to have accessible and accurate information on any or all of the following: the identity, location, connectivity, and routing of various network components within the network.

SUMMARY

In an embodiment of the disclosure, a method of tracking network assets of a data network is provided. The method includes receiving an image including a first asset identifier associated with a first network asset, decoding the first asset identifier to produce a first identification code, and determining, based on the first identification code, a first network connection including the first network asset.

In an aspect of the disclosure, the first network connection is one of a virtual network connection defined in a database system or a physical network connection in the data network.

In another aspect of the disclosure, the image includes a second asset identifier associated with a second network asset, and the method further includes decoding the second asset identifier to produce a second identification code and identifying a second network asset based on the second identification code.

In another aspect of the disclosure, one of the first network asset and the second network asset is a port, and the other of the first network asset and the second network asset is a connector of a patch cord.

In another aspect of the disclosure, the first network connection includes the first network asset and the second network asset.

In another aspect of the disclosure, determining the first network connection based on the first identification code includes transmitting a query including the first identification code to the database system, and receiving a reply to the query from the database system including information defining the first network connection.

In another aspect of the disclosure, determining the first network connection based on the first identification code includes determining a first position of the first asset identifier in the image, determining a second position of the second asset identifier in the image, and determining, based on a relationship between the first position and the second position in the image, a presence of the first connection in the data network.

In another aspect of the disclosure, the first network connection includes the first network asset and the second network asset.

In another aspect of the disclosure, determining the first connection based on the first identification code further includes identifying a third network asset associated with the first identification code, the first network asset is a patch cord connected to the third network asset, and the first connection includes a connection between the second network asset and the third network asset through the first network asset.

In another aspect of the disclosure, the method further includes transmitting a query including the first identification code to the database system, receiving a reply to the query including data defining a second network connection, comparing the first network connection to the second network connection, and in response to the first network connection matching the second network connection, validating the first network connection in the data network.

In another aspect of the disclosure, the method further includes updating the database system to reflect the presence of the first network connection in the data network.

In another embodiment of the disclosure, another method of tracking network assets of the data network is provided. The method includes receiving an image including a first asset identifier having a first position in the image and a second asset identifier having a second position in the image. The method further includes decoding the first asset identifier to produce a first identification code, decoding the second asset identifier to produce a second identification code, and transmitting a query to a database system including the first identification code and the second identification code. In response to receiving a reply to the query including data defining a first network connection between a first network asset associated with the first identification code and a second network asset associated with the second identification code, the method adds a first virtual object that identifies the first network asset to a display, and adds a second virtual object that identifies the second network asset to the display.

In an aspect of the disclosure, the first virtual object and the second virtual object provide an indication that the first network asset is to be connected to the second network asset.

In another aspect of the disclosure, the first virtual object is a bounding box around a connector of a patch cord.

In another aspect of the disclosure, the method further includes adding one or more additional virtual objects to the display indicating a path of the patch cord.

In another embodiment, a method of tracking network assets of a data network includes receiving a first image including a first plurality of asset identifiers; receiving a second image including a second plurality of asset identifiers; decoding each of the first plurality of asset identifiers to produce a first plurality of identification codes; decoding each of the second plurality of asset identifiers to produce a second plurality of identification codes; identifying a first identification code associated with a first network asset that is included in both the first plurality of identification codes and the second plurality of identification codes; identifying a second identification code in the first plurality of identification codes associated with a second network asset connected to the first network asset; identifying a third identification code in the second plurality of identification codes associated with a third network asset connected to the first network asset; and determining, based on the connections between the first network asset and each of the second network asset and the third network asset, that the data network includes a first network connection between the second asset and the third asset.

In one embodiment, the first network asset may be a patch cable, the second network asset may be a first port, and the third network asset may be a second port. The first port may be located in a first rack, the second port may be located in a second rack, and the patch cord may run between the first rack and the second rack. The method may further include updating a database system to indicate the presence of the first connection in the data network.

In one embodiment, the method may further include updating the database system to indicate issuance of a work order to replace the first connection in the data network with a second connection in the data network connecting the second network asset to a fourth network asset. In this embodiment, the method may further include receiving a third image including a third plurality of asset identifiers; decoding each of the third plurality of asset identifiers to produce a third plurality of identification codes including the first identification code, the third identification code, and a fourth identification code associated with the fourth network asset; adding a first virtual object to a display that identifies the first network asset; adding a second virtual object to the display that identifies the fourth network asset; and adding a third virtual object to the display indicating the first network asset should be connected to the fourth network asset.

In yet another embodiment, a system for tracking a plurality of network assets of a data network is disclosed. The system includes one or more asset identifiers coupled to each of the plurality of network assets, a machine vision system configured to detect the one or more asset identifiers on the plurality of network assets, and a database system in communication with the machine vision system for storing and/or retrieving information on the plurality of network assets.

In one embodiment, at least one of the one or more asset identifiers may be view-point agnostic so that the machine vision system may identify the one or more asset identifiers from nearly any vantage point. In an exemplary embodiment, the one or more asset identifiers may include a machine-readable digital label so as to be readable by the machine vision system. For example, the asset identifiers may include colored bands, a barcode, textured surfaces, shapes, polarized-dependent elements, reflective, retroreflective and/or fluorescent elements. In an exemplary embodiment, the one or more asset identifiers may include a series of colored bands. The series of colored bands may include between 3 and 8 bands and between 3 and 6 colors, thus providing a wide range of coding diversity for coding a relatively large number of network assets. In one embodiment, the series of colored bands may include a directional key configured to indicate a read direction of the series of colored bands. Additionally, the series of colored bands may include a color key configured to provide color correction capabilities to the machine vision system.

In an exemplary embodiment, the machine vision system may include one or more cameras. The machine vision system and its cameras may be a fixed part of the data network, such as being attached to certain fixed hardware (e.g., racks, cabinets, etc.) associated with the data network. Alternatively, the machine vision system may form part of a robotic system associated with the data network. In yet a further embodiment, the machine vision system may be configured as a portable device adapted to be carried by a human user. In this embodiment, the machine vision system may include a display for use by the human user. For example, the machine vision system may include a handset or a headset device configured to be carried by the human user. In specific instances, the handset device may include a mobile phone or a tablet, and the headset device includes glasses, goggles or a helmet. These devices may include augmented reality features.

The database system is configured to store information or retrieve information on the plurality of network assets in the data network. This will allow a technician to then access information about the data network during, for example, a maintenance or upgrade operation. In an exemplary embodiment, the database system may be configured in the cloud, and thus readily accessible by machine vision systems at a wide range of work sites. In one embodiment, the system may form part of an asset tracking system, an inventory management system, or a network management system.

BRIEF DESCRIPTION OF THE DRAWINGS

The accompanying drawings are included to provide a further understanding and are incorporated in and constitute a part of this specification. The drawings illustrate one or more embodiment(s), and together with the description serve to explain principles and operation of the various embodiments. Features and attributes associated with any of the embodiments shown or described may be applied to other embodiments shown, described, or appreciated based on this disclosure.

FIG. 5 is a schematic illustration of a system in accordance with an embodiment of the disclosure for tracking network assets in a data network;

FIGS. 7A and 7B are schematic illustrations of network assets in the form of a port on a patch panel in accordance with an embodiment of the disclosure;

DETAILED DESCRIPTION

As described in the background, manual tracking of network assets of a data network may be difficult, time intensive, and prone to introduction of error. In some network environments, such as in active portions of a communications network, network assets may be identified by mapping Media Access Control (MAC) addresses of the active network assets. Using the network map, digital renderings may be made of connections within the network. However, passive network assets, such as fiber optic patch panels, patch cables, connectors, ports, and the like do not have a MAC or a method of actively mapping these assets. Below a system and method for automatically logging, associating, and tracking of passive network assets is provided.

Figure 1:
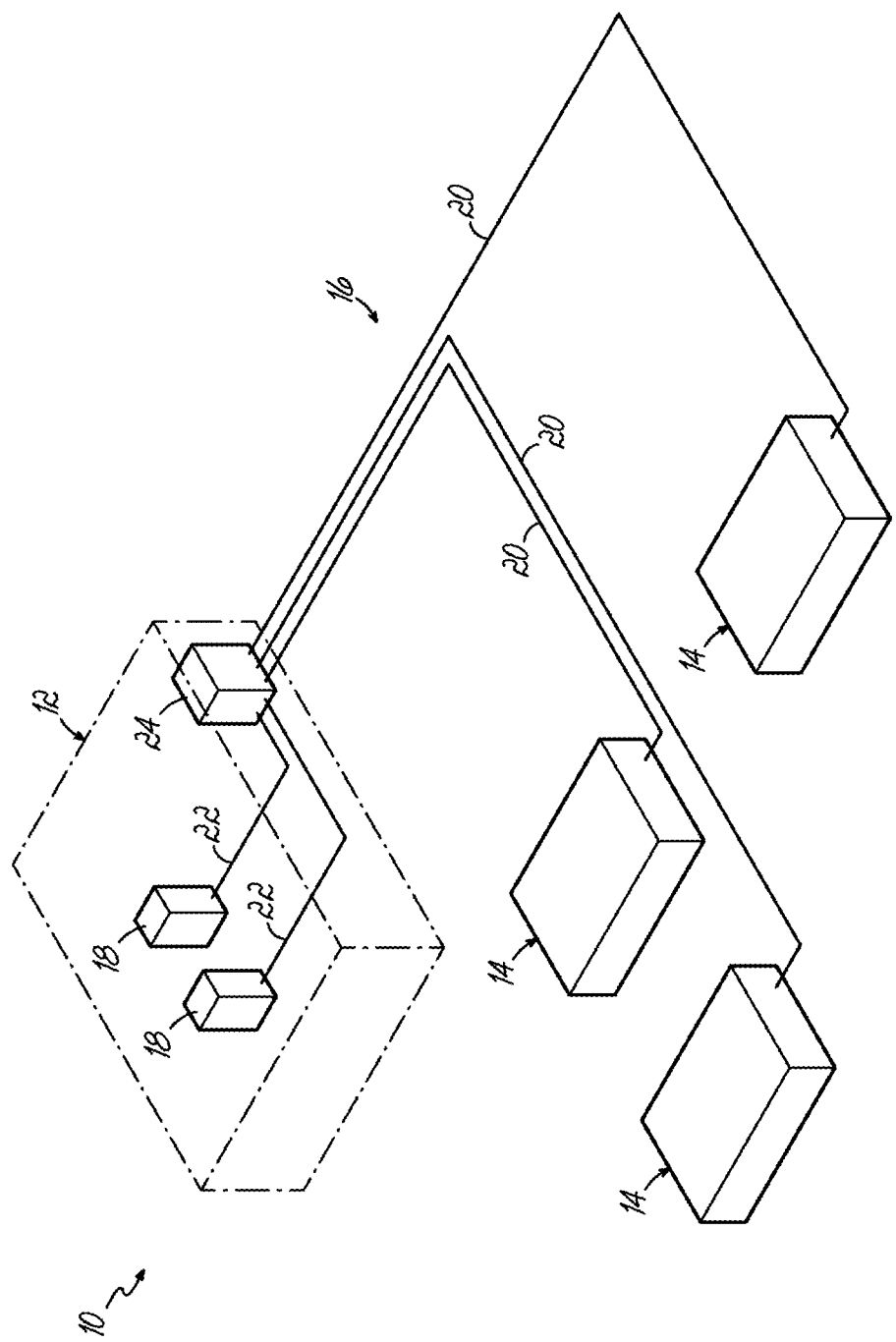
FIG. 1 is a schematic illustration of a data center campus in which embodiments of the disclosure may be used.

As illustrated in FIG. 1 and in one application of the present disclosure, a modern-day data center 10 may include a collection of buildings (referred to as a data center campus) having, for example, a main building 12 and one or more auxiliary buildings 14 in close proximity to the main building 12. While three auxiliary buildings are shown, there may be more or less depending on the size of the campus. The data center 10 provides for a local network 16 that interconnects the auxiliary buildings 14 with the main building 12. The local network 16 allows IT equipment 18 in the main building 12 to communicate with various IT equipment (not shown) in the auxiliary buildings 14. In the exemplary embodiment shown, the local network 16 includes trunk cables 20 extending between the main building 12 and each of the auxiliary buildings 14. Trunk cables 20 generally include a high fiber-count arrangement of optical fibers for passing data and other information through the local network 16. Within the main building 12, a plurality of indoor fiber optic cables 22 ("indoor cables 22") are routed between the IT equipment 18 and one or more distribution cabinets 24. The indoor cables 22 may also generally include a high fiber-count arrangement of optical fibers for passing data and other information through the local network 16. Although only the interior of the main building 12 is schematically shown in FIG. 1, each of the auxiliary buildings 14 may house similar IT equipment 18 for similar purposes.

Figure 2:
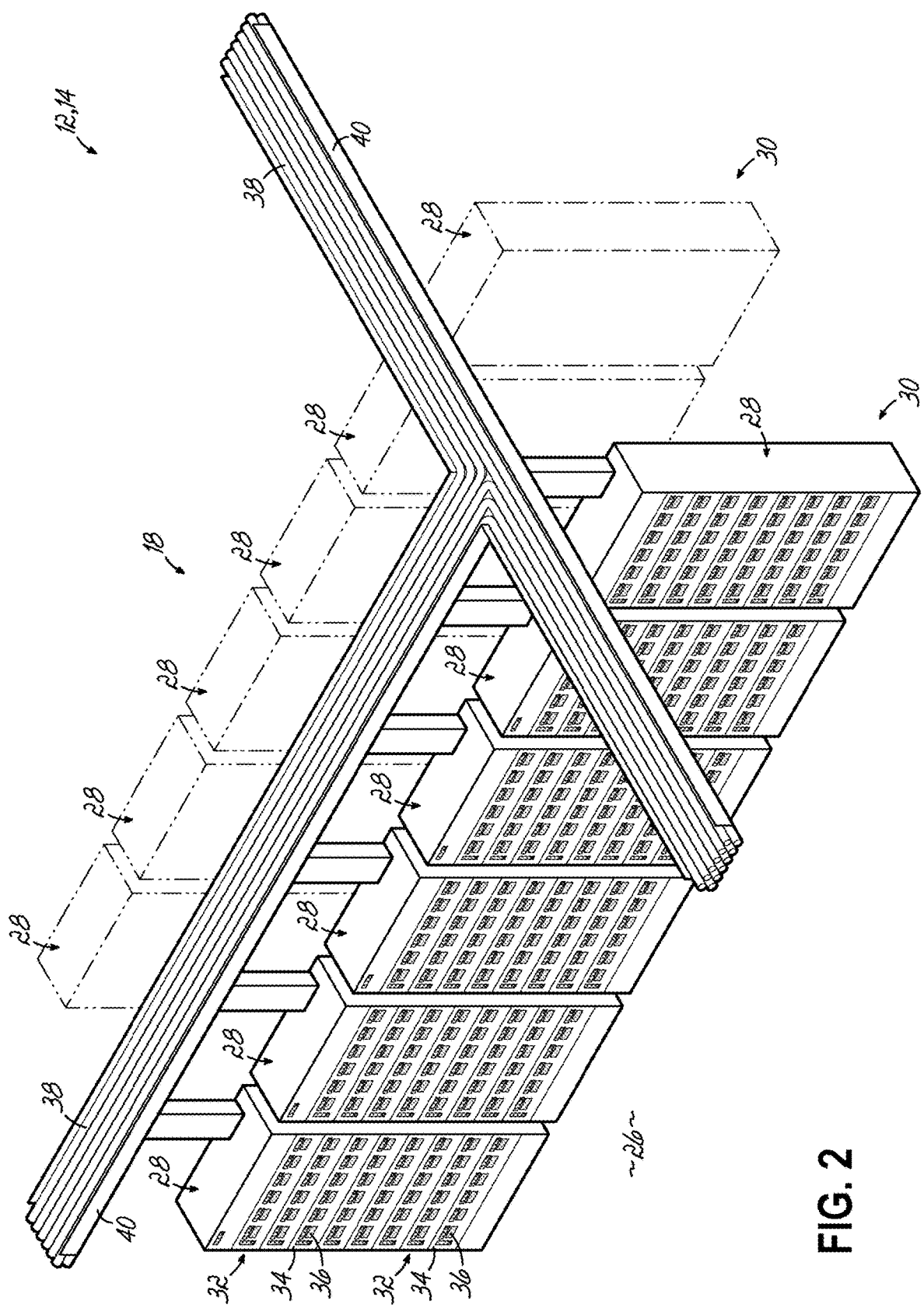
FIG. 2 is a schematic illustration of a room in the buildings of the data center campus including IT equipment.

As discussed above and illustrated in FIG. 2, in a typical data center configuration, the IT equipment 18 in the buildings 12, 14 is arranged in rooms 26 within the buildings 12, 14. In a conventional arrangement, each of the rooms 26 further includes a plurality of racks 28 arranged in rows 30 within the room 26. Each of the racks 28 may include a plurality of housings/frames/shelves 32 for holding the IT equipment 18 and providing an interface for making data connections with the IT equipment 18. By way of example, the housings 32 of the racks 28 may include one or more patch panels 34 or other network interfaces having one or more ports 36 for making a data connection. As demonstrated in this figure, each of the rooms 26 of the data center 10 typically includes a large number of ports 36 for making data connections between the different IT equipment 18 in the data center 10. To facilitate data connections between ports 36 in the data center 10, e.g., typically within the same room 26 or between ports 36 in adjacent rooms 26, relatively short connectorized cables (e.g., fiber optic or copper wire cables), referred to herein as patch cords 38, may be provided. Accordingly, each of the rooms 26 in the data center 10 typically includes a large number of patch cords 38 for achieving the data connections between selected ports 36 on the patch panels 34. The patch cords 38 are generally organized into groups and extend along raceways 40 positioned above the racks 28. As discussed above, due to the large number of ports 36 and patch cords 38 in the rooms 26 of the data center 10, an improved manner of tracking network components in the physical layer, including identifying the network components, knowing their location within the data center 10, knowing their connectivity to other network components, and knowing their routing pathway is desirable.

Figure 3:
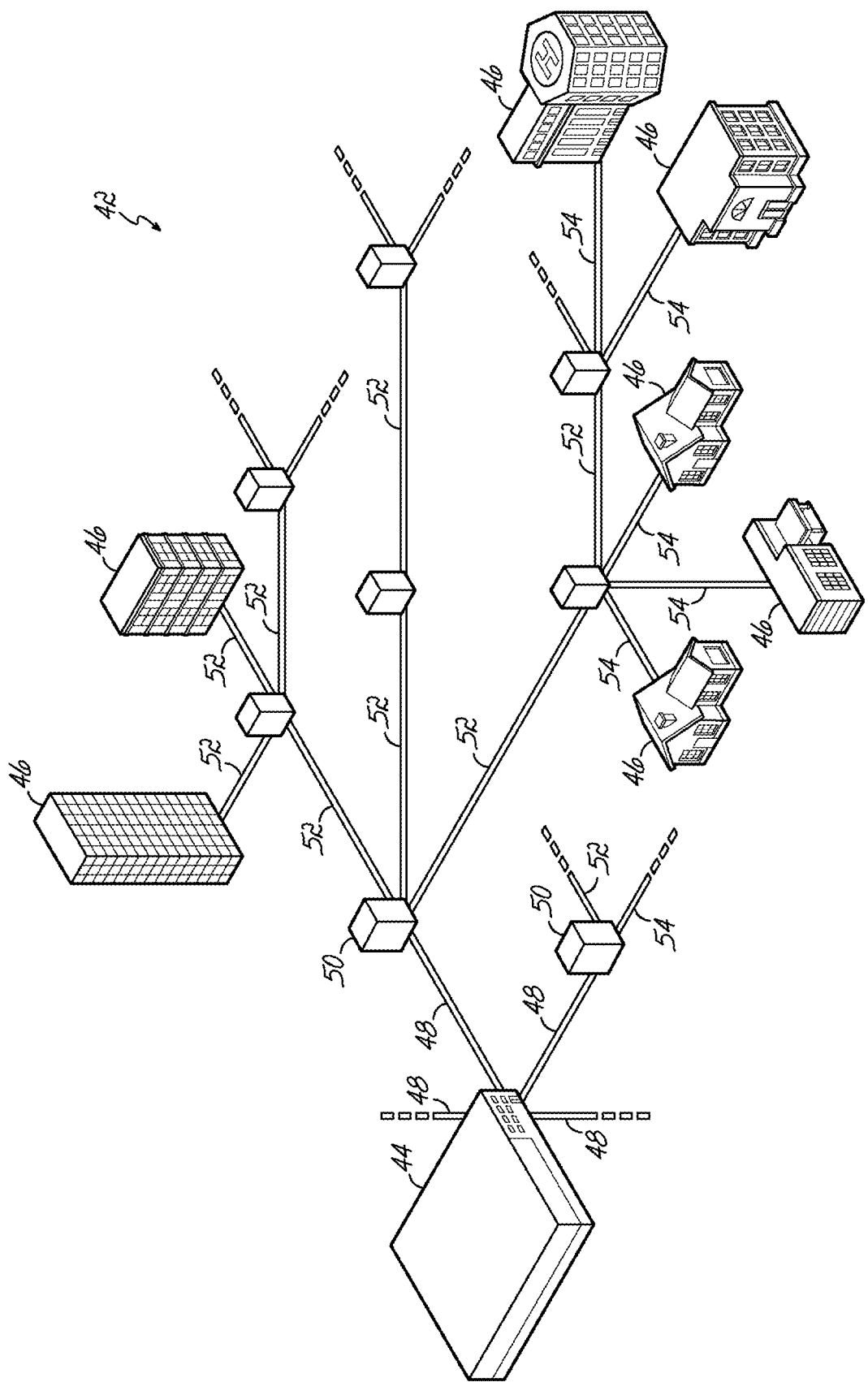
FIG. 3 is a schematic illustration of a carrier network in which embodiments of the disclosure may be used.

In FIG. 3 and in another application of the present disclosure, a schematic diagram of an exemplary FTTx carrier network 42 distributes optical signals generated at a switching point 44 (e.g., a central office of a network provider) to subscriber premises 46. Optical line terminals (OLTs; not shown) at the switching point 44 convert electrical signals to optical signals. Fiber optic feeder cables 48 then carry the optical signals to various local convergence points 50, which act as locations for splicing and making cross-connections and interconnections. The local convergence points 50 often include splitters to enable any given optical fiber in the fiber optic feeder cable 48 to serve multiple subscriber premises 46. As a result, the optical signals are "branched out" from the optical fibers of the fiber optic feeder cables 48 to optical fibers of distribution cables 52 that exit the local convergence points 50.

At remote distribution points closer to the subscriber premises 46, some or all of the optical fibers in the distribution cables 52 may be accessed to connect to one or more subscriber premises 46. Drop cables 54 extend from the distribution points to the subscriber premises 46, which may be single-dwelling units (SDU), multi-dwelling units (MDU), businesses, and/or other facilities or buildings. A conversion of optical signals back to electrical signals may occur at the remote distribution points or at the subscriber premises 46.

Figure 4:
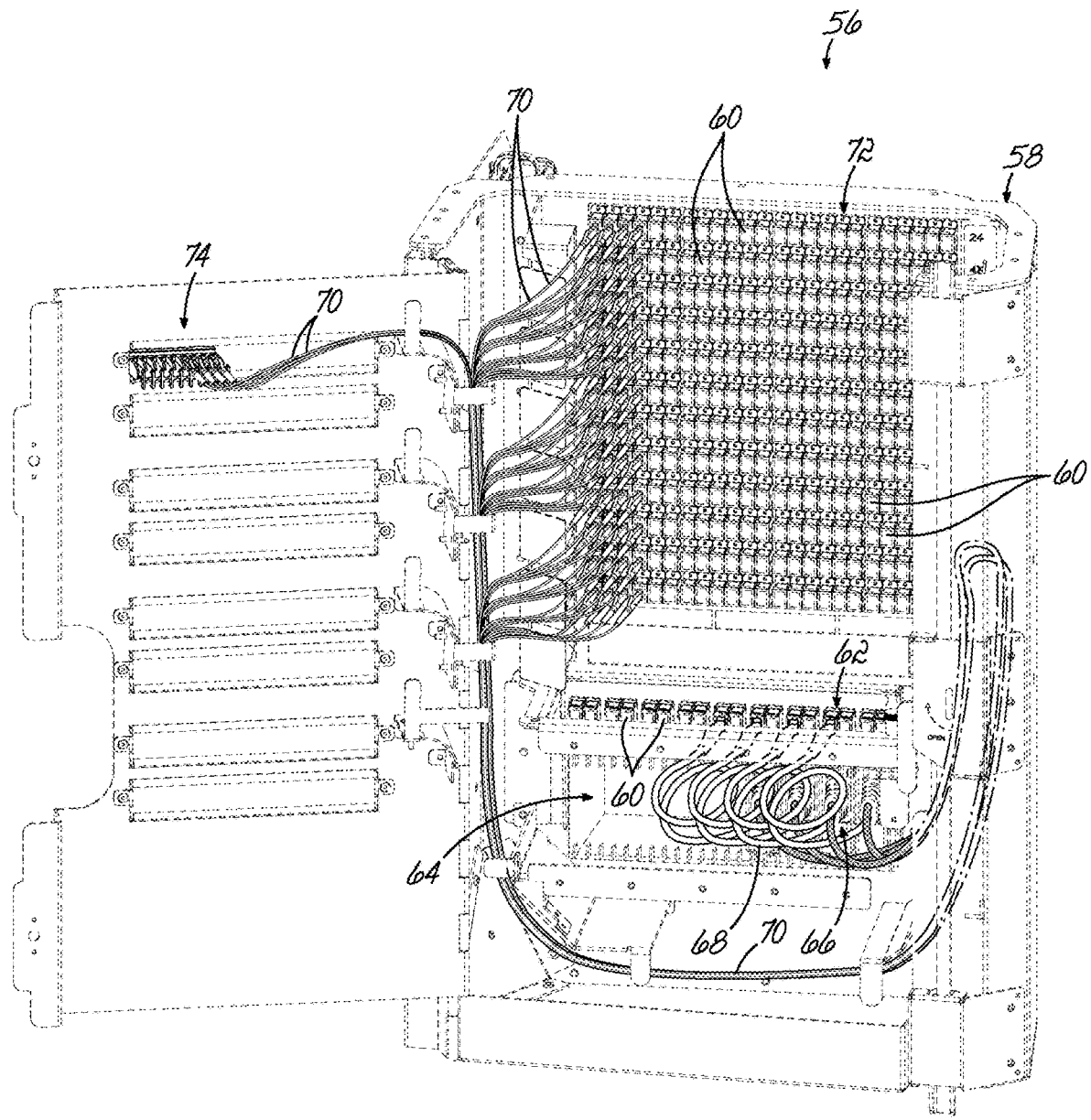
FIG. 4 is a schematic illustration of a distribution point of the carrier network illustrated in FIG. 3.

FIG. 4 illustrates one example of a distribution point 56 to be placed at one of the local convergence points 50 in FIG. 3. The distribution point 56 may be in the form of a cabinet or enclosure that includes a frame 58 installed in a housing (not shown). The frame 58 supports various components for accomplishing the network tasks associated with the local convergence point 50. For example, a row of fiber optic ports 60 supported by the frame 58 defines a feeder field 62 to receive connections associated with one of the feeder cables 48 of the network 42. Optical fibers (not shown) from the feeder cable 48 may be terminated with fiber optic connectors (directly or by splicing to pigtails) that are plugged into the fiber optic ports 60 on the back side of the frame 58.

Below the feeder field 62, the frame 58 defines a region 64 for receiving and supporting splitter modules 66 (e.g., in slots provided in the frame 58). The splitter modules 66 may each include an input cable 68 and a plurality of output cables 70. The splitter modules 66 each include an optical splitter (not shown) so that a multiplexed signal carried by the input cable 68 can be separated into demultiplexed signals carried by the output fibers of the output cables 70. The multiplexed signal typically comes from the feeder cable 48. To this end, the input cable 68 of the splitter modules 66 may be terminated with a fiber optic connector and plugged into the front side of the fiber optic ports 60 in the feeder field 62, thereby establishing data connections with the feeder cable 48.

The output cables 70 that are "live" (i.e., used in the network to carry signals to and from subscribers) are plugged into the front side of fiber optic ports 60 in a distribution field 72. There are typically several or many rows of ports 60 defining the distribution field 72. These ports 60 are used to establish data connections with optical fibers of one or more distribution cables 52 or drop cables 54 that exit the distribution point 56 and carry signals further into the carrier network 42 so that ultimately the signals can reach the subscriber premises 46. The output cables 70 that are not used for live network traffic (e.g., "dark fiber"), and instead are reserved for future subscribers, may be routed to a storage location 74 for use at a later date. Similar to the above, due to the large number of ports 60 and cables 68, 70 in the distribution points 56 of the FTTx carrier network 42, an improved manner of tracking the network components (ports 60 and cables 68, 70) in the physical layer, including identifying the network components, knowing their location within the carrier network 42, knowing their connectivity to other network components, and knowing their routing pathway is desirable.

While the particular network environment for aspects of the present disclosure discussed below includes a data center 10 and carrier network 42, aspects of the present disclosure are not limited to these environments. Most any aspect of a data network where traceability of network components proves advantageous may provide the suitable environment for implementation of aspects of the present disclosure. For example, aspects of the present disclosure may be beneficial in passive optical networks (PON), access networks, optical line terminals (OLT) or optical network units (ONU) in an access or PON network, multiplexers, switches, routers, or other suitable aspect of the data network. Accordingly, aspects of the present disclosure should not be limited to data center or carrier network applications as described herein.

In accordance with an embodiment of the disclosure and as illustrated in FIG. 5, a system 80 that facilitates the digital tracking of network components (referred to generally herein as "network assets" 82) in a data network is illustrated. System 80 may operate as a stand-alone digital tracking system, or may be integrated with another system, such as an asset management system, network management system, an inventory management system, or any other suitable system where information relating to system assets is relevant. The term tracking is meant to encompass information including but not limited to asset identification, asset location, and asset connectivity (i.e., taken collectively, information pertaining to the physical layer of the data network). The system 80 includes one or more asset identifiers 84 on or otherwise associated with the network assets 82, a machine vision system 86 for ascertaining information about the network assets 82 from the asset identifiers 84, and a database system 88 for storing and selectively accessing information about the physical layer of the data network. As used herein, a network asset 82 includes any component which may be used to implement the physical layer of a network. Thus, network assets 82 encompass a wide range of components or portions of components used in the data network. By way of example and without limitation, in one embodiment the network asset 82 may include a patch panel 34, ports 36 of a patch panel 34, patch cords 38, and/or connectors of patch cords 38. In an alternative embodiment, the network asset 82 may include input cables 68, output cables 70, connectors associated with cables 68, 70, ports 60 in the feeder field 62, and/or ports 60 in a distribution field. These are merely exemplary and other components of the data network may serve as network assets 82. For example, a port or a pigtail in a PON network, a port on a wavelength division multiplexing (WDM) multiplexer, an element of a converged access network, an OLT or ONU port in an access/PON network, a power port, or an ethernet port on a switch or router may also serve as a network asset in accordance with aspects of the disclosure. Thus, a wide range of network components or portions thereof may serve as a network asset 82 in the context of the present disclosure and therefore should not be limited to any particular one or group of components or elements. Other example may include, without limitation a point to point access network, a splitter based network, and a WDM based network, and a WDM Radio Access Network (RAN) connecting 4G and 5G antennas.

In accordance with an aspect of the present disclosure, each network asset 82 may include one or more asset identifiers 84 associated with the network asset 82 that enable tracking of the network asset 82 in the data network. In embodiments of the disclosure, an asset identifier 84 may include a machine-readable digital label 90, such as barcodes color codes QR codes, or other suitable readable labels, configured to be "read" by the machine vision system 86 of the system 80. Because the machine vision system 86 is configured to read asset identifiers 84 in its field of vision (possibly one, a few, or many asset identifiers 84), it may be advantageous for the asset identifiers 84 to be decodable from a wide range of angles and in a wide range of lighting conditions.

Thus, in an aspect of the disclosure, the asset identifiers 84 are configured to be view-point agnostic or omni-directional, and thus be visible to and decodable by the machine vision system 86 from nearly any angle. This feature is a departure from many labels (e.g., such as barcodes) used in current automated systems, which often require a flat presentation of the label and a clear field of vision by an adjacent reader. In an exemplary embodiment, a view-point agnostic identifier may be achieved, for example, by wrapping the machine-readable digital label 90 completely around (e.g., a substantially full 360°) at least a portion of the network asset 82. By way of example, the machine-readable digital label 90 may be wrapped about a portion of the network asset 82 in a substantially cylindrical or conical configuration. As can be appreciated, these geometric configurations allow the machine-readable digital label 90 to be decoded when viewed by the machine vision system 86 from large range of angles or many vantage points.

Figure 6A:
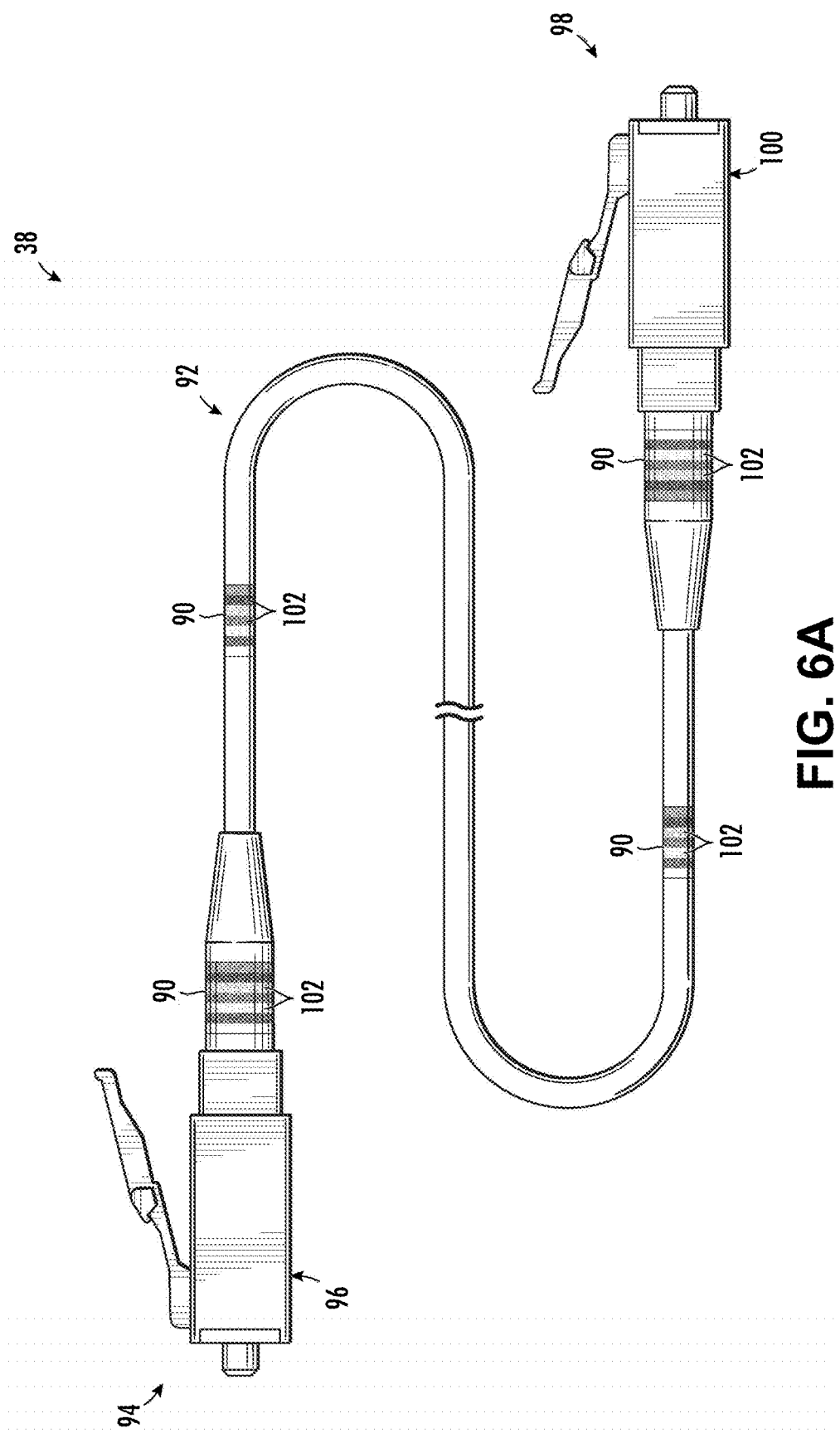
FIG. 6A is an illustration of a network asset in the form of a patch cord in accordance with an embodiment of the disclosure.

By way of example, FIG. 6A illustrates a network asset 82 in the form of a patch cord 38 which includes at least one, and preferably a plurality of machine-readable digital labels 90 attached thereto that are view-point agnostic. As illustrated in this figure, the patch cord 38 includes an intermediate length of cable 92 having a first end 94 terminated by a connector 96 and a second end 98 terminated by another connector 100. Such patch cords 38 and their construction are generally well known in the art and a further description of the conventional features of the patch cord 38 and its construction will not be discussed here. In a similar manner, a wide range of connectors 96, 100 and their construction are generally known in the art and a further description of those connectors will not be discussed here.

In an exemplary embodiment, each connector 96, 100 of the patch cord 38 may include a machine-readable digital label 90. The label 90 may be located on most any aspect of the connectors 96, 100 so long as they are viewable from substantially any angle relative to the machine vision system 86. In one embodiment, for example, the machine-readable digital labels 90 may be disposed about the strain-relief features of the connectors 96, 100. In an alternative embodiment, the machine-readable digital labels 90 may be disposed on the outer sheath of the intermediate cable 92 adjacent the connectors 96, 100. In addition, the patch cord 38 may include one or more machine-readable digital labels 90 disposed along the length of the intermediate cable 92. By way of example, a machine-readable digital label 90 may be disposed about the outer sheath of the intermediate cable 92 at select positions along the length of the intermediate cable 92. Alternatively, a machine-readable digital label 90 may be disposed about the outer sheath of the cable 92 at a regular interval along the cable 92 (e.g., every meter). This allows the connectors 96, 100 of the patch cord 38 (end points of the patch cord 38), and possibly points intermediate the connectors 96, 100 of the patch cord 38 to be recognized by the machine vision system 86. This, in turn, provides end point traceability and pathway traceability of the patch cord 38. In one embodiment, all of the machine-readable digital labels 90 associated with a particular network asset 82 (e.g., patch cords 38) may be the same type. In an alternative embodiment, however, the labels 90 associated with the same network asset 82 may be different types.

The machine-readable digital label 90 may take several forms. By way of example, the machine-readable digital label 90 may include a series of colored bands or colored patterns, a barcode, textured surfaces, shapes, or colors not visible to humans (e.g., ultra-violet light in the 400-450 nanometer (nm) wavelength range or infrared light in the 650-900 nm wavelength range). Furthermore, the machine-readable digital label 90 may include fluorescent and/or polarization-dependent coding elements. Polarization-dependent elements reflect incident light with a change in its polarization such as increasing the degree of polarization, converting linearly polarized light to elliptical or circular light. Fluorescent-dependent coding elements refers to materials in which the light emitted is generated from an external light source at a different frequency or wavelength. Aspects of the disclosure are not limited to these exemplary configurations as other characteristics may be used to provide differentiating features that used alone or in combination may be used as a unique identifier.

As illustrated in FIG. 6A, in one embodiment, the machine-readable digital label 90 may include a series of colored bands 102 adjacent each other. The coding diversity of the machine-readable digital label 90 is provided by the number of bands 102 and the number of colors used in the bands 102. For example, in one embodiment the machine-readable digital label 90 may include between 3 and 8 bands 102 with between 3 and 6 colors. The number of unique identification codes, or "identifiers" is generally given by $M^N$, where M is the number of colors and N is the number of bands 102 in the machine-readable digital label 90. Thus, for a machine-readable digital label 90 using 8 bands and 6 colors, there are a total of 1,679,616 unique identifiers. In other applications, such a large number of identifiers may not be necessary and a machine-readable digital label 90 having 6 bands with 3 colors (total of 729 unique identifiers) may be more appropriate. It should be recognized that other numbers of bands and colors may be used depending on the particular application and the number of bands and colors may be selected to provide the desired coding diversity required in a particular application.

In one embodiment in accordance with the disclosure, the machine-readable digital label 90 may be configured to provide a read direction for the label. For example, in the case of the machine-readable digital label 90 being a series of colored bands 102 on a patch cord 38, the label 90 may be read from a starting point closest to the connectors 96, 100 or furthest from the connectors 96, 100. The read direction may affect decoding of the label 90 due to possible symmetries in the color sequence of the machine-readable digital label 90. To maximize the possible number of unique identifiers and increase identification code diversity, a read direction of the machine-readable digital label 90 may be established. In one embodiment, a read direction of the label 90 may be established by using one of the bands 102 in the sequence of bands 102 as a directional key. For example, either the first or last band 102 (i.e., a predetermined location) in the sequence of bands 102 may have a dedicated color or feature distinguishable by the machine vision system 86 that indicates the read direction (e.g., starting/stopping point) of the machine-readable digital label 90. Those of ordinary skill in the art may well recognize other features of the machine-readable digital label 90 that may operate as a directional key for the label 90.

In addition to enabling a greater number of unique identifiers, increasing identification code diversity may also allow for increased minimum Hamming distances between the unique identifiers used in a particular network. For example, the unique identifiers used within a particular network may be selected from the set of all possible unique identifiers so that the minimum Hamming distance between the unique identifiers is greater than one. This increased minimum Hamming distance may enable the machine vision system 86 to detect and/or correct errors made decoding asset identifiers 84. This ability to detect and/or correct decoding errors may in turn enable the machine vision system 86 to correctly decode asset identifiers 84 which are partially obstructed, thereby improving system reliability and performance.

In another embodiment in accordance with the disclosure, the machine-readable digital label 90 may be configured to provide color correction capabilities. This may be important because images of the asset identifier 84 may occur in a wide range of ambient lighting, thereby affecting the image of the asset identifier 84. For example, in the case of the machine-readable digital label 90 being a series of colored bands 102 on a patch cord 38, the variation of the ambient lighting, shading and possibly other effects in an image captured by the machine vision system 86 may cause the colors of the bands 102 to appear differently. To address this variability, at least one of the bands 102 may be used to provide color calibration.

For example, a band 102 in a predetermined location in the machine-readable digital label 90 may be a known, dedicated color, such as a neutral white or grayscale color, and thus be used as a color key. The deviations in the color key between the color of the key in the captured image and the key's known color characteristics provides a color correction factor that may be applied to the remaining bands 102 in the machine-readable digital label 90. This will allow captured color images having variable and uncontrolled ambient lighting or other effects to be corrected to provide a more accurate color sequencing of the machine-readable digital label 90. In one embodiment, the directional key and the color key may be provided by different bands 102 of the machine-readable digital label 90. In an alternative embodiment, however, the directional key and the color key may be provided by the same band 102 of the machine-readable digital label 90.

In one embodiment, the asset identifier 84 may be incorporated into the network asset 82 as part of the manufacturing of the asset 82. By way of example, colored inks and printing techniques or colored injection molded plastics may be used to form the colored bands 102 of the machine-readable digital label 90 during manufacture of the network asset 82 (e.g., patch cord 38). Alternatively, the asset identifier 84 may be added to the network asset 82 as a separate process and after manufacture of the asset 82. For example, colored films or tapes may be adhesively or thermally bonded to the network asset 82 after manufacturing and prior to or during installation of the network asset 82. Asset identifiers 84, such as machine-readable digital labels 90, may be added to existing network assets 82, such as in a retrofit or brownfield application. Those of ordinary skill in the art may recognize other processes for incorporating the asset identifier 84 with the network asset 82 that are within the scope of the present disclosure.

FIGS. 7A and 7B illustrate a network asset 82 in the form of a port 36 in a patch panel 34 and includes at least one machine-readable digital label 104 associated with the port 36. For example, each port 36 in the patch panel 34 may be associated with one machine-readable digital label 104. The machine-readable digital labels 104 may be positioned adjacent their respective ports 36, such as immediately above or beside their respective ports 36 (including around their respective ports 36). In one embodiment illustrated in FIG. 7A, the machine-readable digital labels 104 may not be configured as view-point agnostic. Instead, the machine-readable digital labels 104 may be positioned generally flat along the patch panel 34. For example, the machine-readable digital labels 104 may be provided by stickers, placards, etc. that are adhered or otherwise attached to the patch panel 34 adjacent their corresponding ports 36. In one embodiment, for example, the flat machine-readable digital label 104 may include a series of colored stripes 106 similar to the colored bands 102 discussed above. In an alternative embodiment illustrated in FIG. 7B, however, the machine-readable digital labels 104 may be configured as view-point agnostic similar to the machine-readable digital label 90 associated with the patch cord 38. By way of example, a cylindrical or conical-shaped post 108 may be positioned adjacent each of the ports 36 of the patch panel 34. Similar that that described above, each of the posts 108 may include a plurality of colored bands 102 extending around the post 108 and may be decodable by the machine vision system 86 from most any vantage point.

Figure 6C:
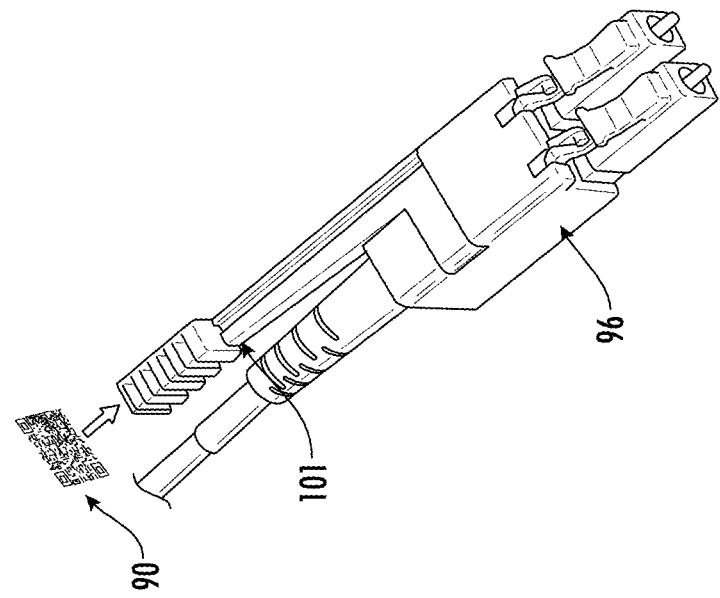
FIGS. 6B-6D is an illustration of network assets in a data network including various label carriers in accordance with an example embodiment.
Figure 6D:
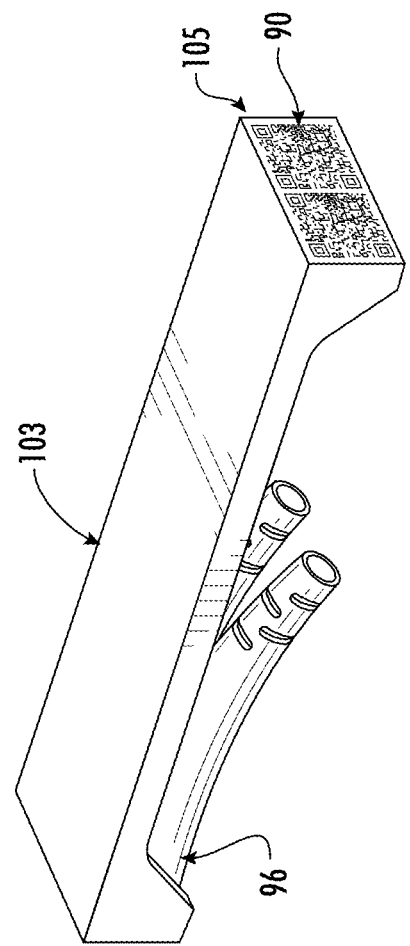
Figure 6B:
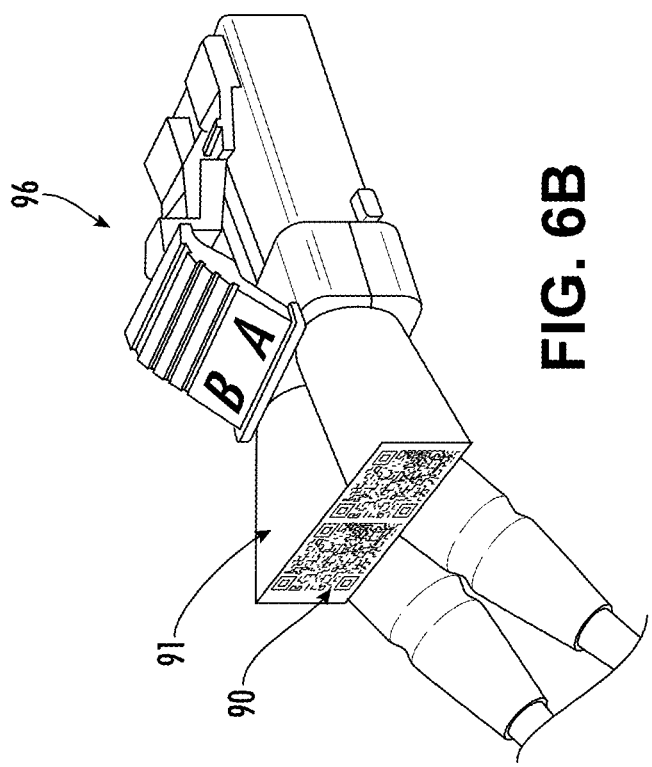

Turning to FIG. 6B-6D, in some example embodiments, for example datacenters with high connection density, it may be advantageous to dispose the readable digital labels in a plane offset from the front of the patch panel 34. The offset may enable fiber routing behind the readable digital label 90, thereby limiting or preventing interference with reading of the digital readable labels 90 by poor fiber routing or grooming. The example depicted in FIG. 6B, a vertical label mount 91 extends from the boot of the connector 96. The label mount 91 may extend substantially perpendicular to the direction of insertion and removal of the connector 96. The label mount 91 may be integral to the boot of the connector 96 or may be clipped on to the boot of the connector 98. FIG. 6C depicts an example connector 96 including a longitudinal extension 101. In some example embodiments, the longitudinal extension 101 may be a push/pull actuator for installation and removal of the connector 96. The readable digital label 90 may be disposed on the end of the longitudinal extension 101. In the example depicted in FIG. 6D, the connector may include a label carrier 103. The label carrier 103 may be integral to the connector 96, such as injection molded with, or may be clipped to the housing of the connector 96. The label carrier 103 may extend longitudinally from a top of a connector 96. The label carrier 103 may include a label face 105, configured to display an attached readable digital label 90. The label face 105 may extend perpendicularly toward the connector side of the label carrier 103 at an offset distance from the rear of the connector 96. The offset distance may be sufficient to enable routing of optical fibers between the connectors 96 and the label face 105, such that the label face 105 is not obstructed by an optical fiber during reading, as described below.

Figure 8:
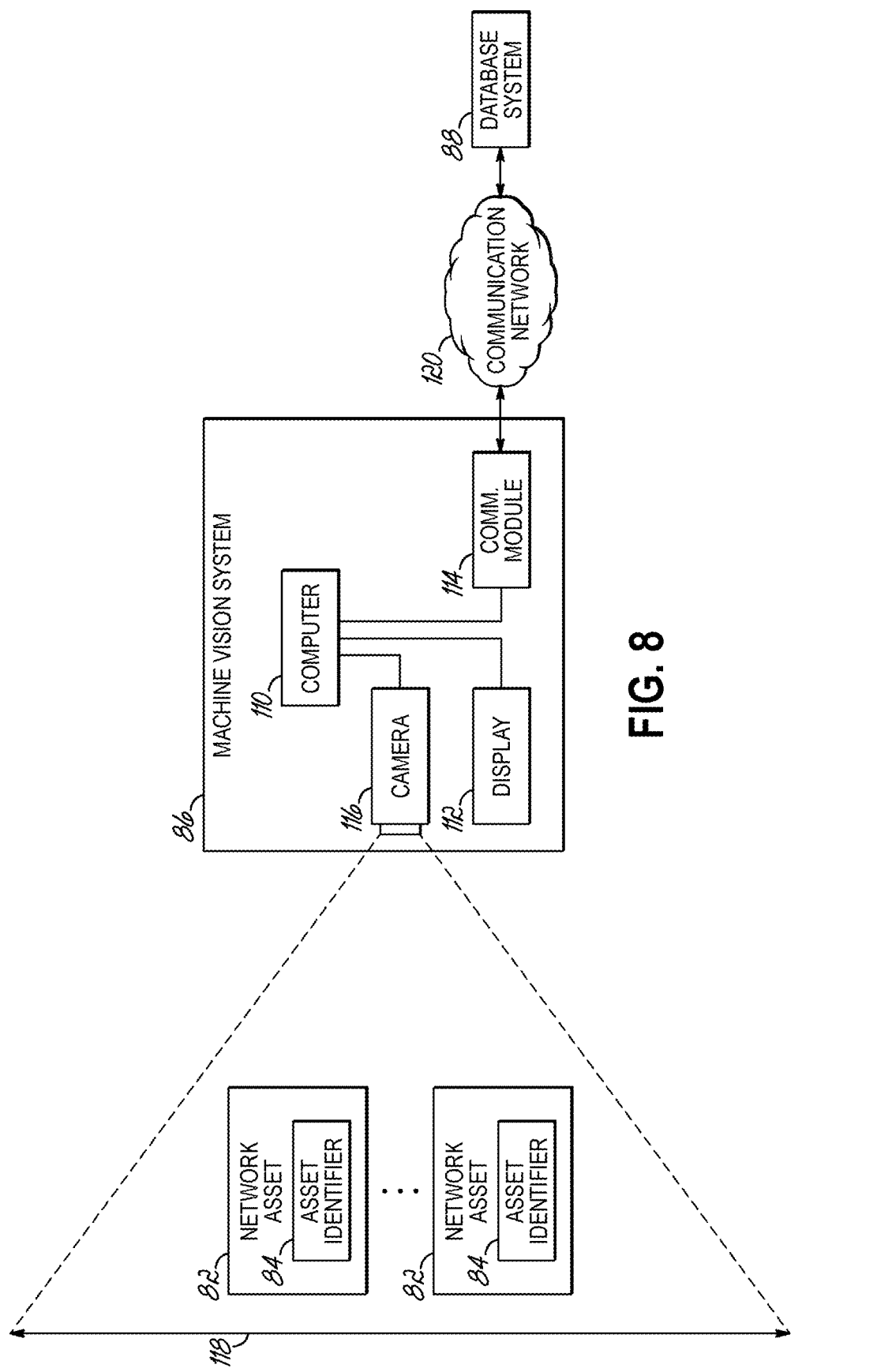
FIG. 8 is a schematic illustration of a machine vision system in accordance with an embodiment of the disclosure.

FIG. 8 depicts a machine vision system 86 in accordance with an aspect of the disclosure and generally includes a computer 110 operably coupled to a display 112, a communication module 114, and a camera 116 having a field of view 118 for viewing one or more network assets 82, and more particularly, the asset identifier 84 thereof, associated with a data network or a portion thereof. The field of view 118 of camera 116 may be similar to that of the user so that the machine vision system 86 receives images corresponding to what the user is viewing. The machine vision system 86 may also include or receive images from additional cameras (not shown) in order to identify network assets 82 that are not within the field of view 118 of camera 116.

Using machine vision to identify network assets 82 provides several advantages over conventional methods of managing the physical layer. The ubiquity of smart phones and the emergence of headsets, wearable and smart glasses that include a high-quality camera and Internet communication capabilities may allow a technician to use the machine vision system by merely downloading a machine vision application into their smart phone. This feature avoids the need to provide specialized equipment to technicians in the field. The lack of specialized equipment could enable a technician, for example, to download the application to their smart phone on a moment's notice (e.g., while talking to a dispatcher at a network operations center), take a picture of the network asset at issue, and resolve a network connection problem without leaving the worksite. As such, aspects and methods in accordance with the disclosure are primarily (other than the asset identifier 84) software based. Accordingly, the machine vision system 86 may thereby reduce both costs and the amount of time required to resolve physical layer network issues as compared to known systems.

In one embodiment, the machine vision system 86 may be a fixed part of the data network hardware, such as being mounted to racks 28 within the rooms 26 of a data center 10 or being mounted to various distribution points 56 of a carrier network 42. In an alternative embodiment, however, the machine vision system 86 may be configured as a portable device, e.g. a machine vision device, that is, for example, carried or worn by a service technician or other user. In one embodiment, the portable device may include various types of hand units or head units. By way of example, this may include a portable smartphone or tablet computer running a machine vision application, or glasses, goggles, helmets or other headsets running a machine vision application. In yet another embodiment, the machine vision system 86 may be integrated into another device, such as a robot or other automated aspect of an automated management system, for monitoring or changing the physical layer of the data network.

The display 112 may include a screen on the user device, a head-mounted display, an optical head-mounted display, or any other device suitable for displaying visual information to a user. In embodiments where the machine vision system 86 is integrated into a robot, the display 112 may be omitted. The machine vision system 86 may display video in real time on the display 112 showing the network assets 82 within the field of view 118. In a further aspect of the disclosure, and as will be discussed in more detail below, the machine vision system 86 may enhance the video with computer-generated graphics that provide information to the user, such as indicators which identify network assets 82 and their connectivity, e.g., what ports 36 the connectors 96, 100 of a patch cord 38 are to be connected to and instructing or otherwise guiding the user to make those connections.

The communication module 114 may be configured to connect to a communication network 120 through a wireless connection to a local access or cellular network. The communication network 120 may include one or more public or private networks, e.g., a local access network, wireless carrier, wide-access network, the Internet, etc. The communication module 114 may thereby enable the computer 110 of machine vision system 86 to transmit data to and receive data from the database system 88.

The database system 88 may collect and organize data relating to the physical layer and/or network layer of one or more networks subject to the system 80. Information associated with each network asset 82 in the database system 88 may include the type or identification of the network asset 82, the location of the network asset 82, the identification code encoded in the asset identifier 84 associated with the network asset 82, other network assets 82 to which the network asset 82 is connected, or any other suitable data relating to the network asset 82.

Data maintained by the database system 88 may include a database including data and supporting data structures that store and organize the data. In particular, the database of database system 88 may be arranged with any database organization or structure including, but not limited to, a relational database, a hierarchical database, a network database, or combinations thereof. The database system 88 may also include a database management system in the form of a computer software application executing as instructions on a database server. The database management system may be used to access the data stored in records of the database of database system 88 in response to a query, which may be dynamically determined and executed by the database management system.

Figure 9:
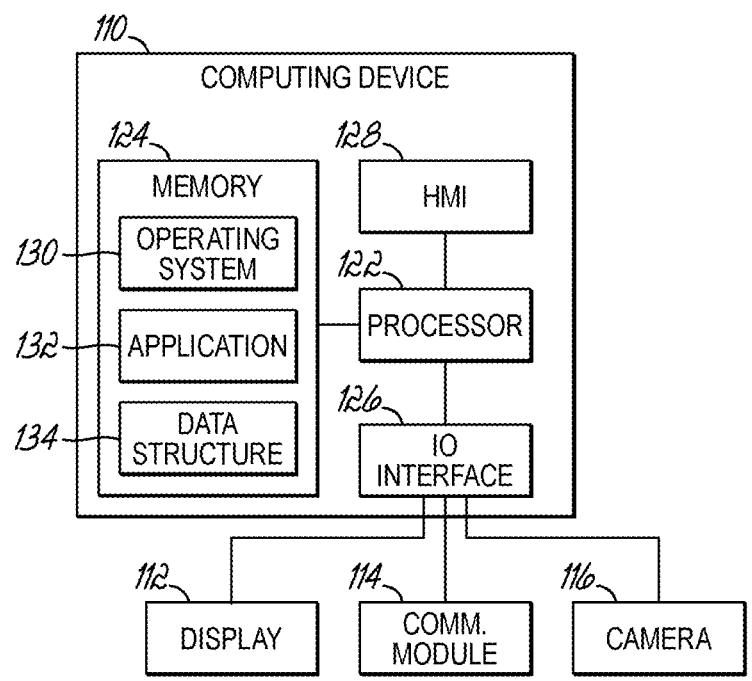
FIG. 9 is a schematic illustration of a computing device in accordance with an embodiment of the disclosure.

Referring now to FIG. 9, the computer 110 may include a processor 122, a memory 124, an input/output (I/O) interface 126, and a Human Machine Interface (HMI) 128, also referred to as a user interface. The computer 110 may also be operatively coupled to one or more external resources (not shown) via the communication network 120. External resources may include, but are not limited to, servers, databases, mass storage devices, peripheral devices, cloud-based network services, or any other resource that may be used by the computer 110 to implement features of the machine vision system 86.

The processor 122 may include one or more devices selected from microprocessors, micro-controllers, digital signal processors, microcomputers, central processing units, field programmable gate arrays, programmable logic devices, state machines, logic circuits, analog circuits, digital circuits, or any other devices that manipulate signals (analog or digital) based on operational instructions stored in memory 124. Memory 124 may include a single memory device or a plurality of memory devices including, but not limited to, read-only memory (ROM), random access memory (RAM), volatile memory, non-volatile memory, static random access memory (SRAM), dynamic random access memory (DRAM), flash memory, cache memory, or data storage devices such as a hard drive, optical drive, tape drive, volatile or non-volatile solid state device, or any other device capable of storing data.

The processor 122 may operate under the control of an operating system 130 that resides in memory 124. The operating system 130 may manage computer resources so that computer program code embodied as one or more computer software applications, such as an application 132 residing in memory 124, may have instructions executed by the processor 122. One or more data structures 134, such as computer program code, may also reside in memory 124, and may be used by, or executed by, the processor 122, operating system 130, or application 132 to store, data, manipulate data, and/or perform one or more of the methods described herein.

The I/O interface 126 may provide a machine interface that operatively couples the processor 122 to other devices and systems, such as the display 112, communication module 114, and camera 116. The application 132 may thereby work cooperatively with the other devices and systems by communicating via the I/O interface 126 to provide the various features, functions, applications, processes, or modules comprising embodiments of the machine vision system 86. The application 132 may also have program code that is executed by one or more external resources, or otherwise rely on functions or signals provided by other system or network components external to the computer 110. Indeed, given the nearly endless hardware and software configurations possible, persons having ordinary skill in the art will understand that embodiments of the disclosure may include applications that are located externally to the computer 110, distributed among multiple computers or other external resources, or provided by computing resources (hardware and software) that are provided as a service over the network 120, such as a cloud computing service.

The HMI 128, or user interface, may be operatively coupled to the processor 122 of computer 110 to allow a user to interact directly with the computer 110. The HMI 128 may include video or alphanumeric displays, a touch screen, a speaker, and any other suitable audio and visual indicators capable of providing data to the user. The HMI 128 may also include input devices and controls such as an alphanumeric keyboard, a pointing device, keypads, pushbuttons, control knobs, microphones, touchpads, etc., capable of accepting commands or input from the user and transmitting the entered input to the processor 122. The HMI 128 may also include sensors for orientation, acceleration, position (e.g. GPS) or the like.

Figure 10:
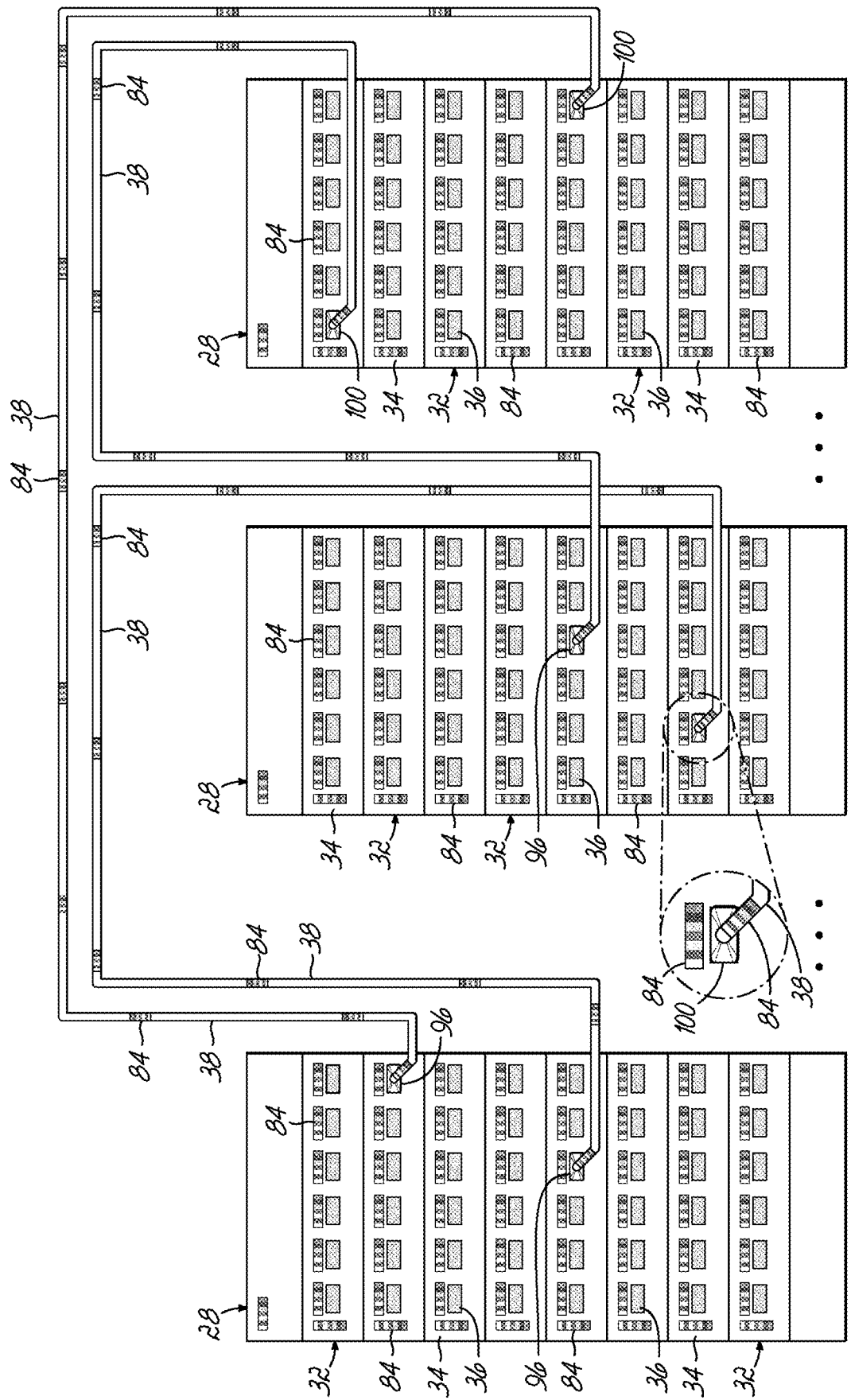
FIG. 10 is a schematic illustration of a portion of a data network including a plurality of racks in accordance with an embodiment of the disclosure.

FIG. 10 depicts an exemplary portion of a data network including a plurality of racks 28 (e.g., three racks), with each rack 28 including a plurality of panels 34 (e.g., 12 panels provided by 12 housings/shelves 32), and each panel 34 including a plurality of ports 36 (e.g., six ports). The portion of the network may be, for example, a greenfield installation of network assets 82 (e.g., servers, routers, switches, etc.) that are in the process of being connected by patch cords 38 in a data center 10 according to a work order.

To this end, a plurality of patch cords 38 (e.g., three cables), each including a pair of terminating connectors 96, 100, may connect one or more pairs of ports 36. As depicted in FIG. 10, the patch cords 38 typically connect ports 36 in different racks 28. However, aspects of the disclosure are not so limited, and it should be understood that patch cords 38 may also connect ports 36 within a single rack 28. The ports 36 connected by the patch cords 38 may be in different racks 28 in the same row 30, in different rows 30, or in different rooms 26. Thus, any port 36 may be physically connected to any other port 36 by a patch cord 38 as needed in order to implement a physical layer of the data network that enables implementation of a network layer configuration defined in the database system 88.

Each rack 28, housing/shelf 32, panel 34, port 36, and patch cord 38 may include one or more asset identifier 84. Each asset identifier 84 may have encoded therein information that uniquely identifies a network asset 82. In cases where a single network asset (e.g., a patch cord) includes multiple asset identifiers 84, each asset identifier 84 may have the same encoded information. Each asset identifier 84 may be physically associated with its respective network asset 82 by proximity or connection to the network asset 82 and may be logically associated with its respective network asset 82 in the database system 88 by the encoded identifier 84. Although FIG. 10A depicts the racks 28, panels 34, ports 36, and patch cords 38 as each having at least one asset identifier 84, it is not necessary that all network assets 82 be associated with an asset identifier 84.

For example, certain embodiments in accordance with the disclosure may rely solely on identification of ports 36, solely on identification of patch cords 38, or solely on identification of ports 36 and patch cords 38 to determine network connectivity, in which case rack 28 and panel 34 identifiers 84 would be unnecessary. In another embodiment according to the disclosure, ports 36 could be identified based on their position in a panel 34, in which case only the panel 34 would need to be associated with a network identifier 84. In yet another embodiment of the disclosure, panels 34 could be identified based on their position in the rack 28, in which case only the rack 28 would need to be identified, e.g., by a network identifier 84.

In addition to including an asset identifier 84, as discussed above, network assets 82 may also be associated with one or more machine readable electronic tags, such as a RFID tag, NFC tag, or the like (not shown). These electronic tags may be interrogated using a non-directional electromagnetic signal emitted by the machine vision system 86, for example. In response to receiving the interrogation signal, the electronic tags (if present) may enable a machine vision system 86 to identify any network assets 82 that are proximate to the machine vision system 86, e.g., in the same room 26, row 30, or rack 28 as, or within the blast-radius of, the machine vision system 86. For example, a rack 28 could be identified by an electronic tag. Once the rack 28 has been identified, a panel 34 could be identified based on its position within the rack 28 (e.g., third panel 34 from the top of the rack 28), and a port 36 by its position within the panel 34 (e.g., fifth port 36 from the left in the panel 34). Thus, embodiments of the disclosure may include a mix of network assets 82 that are associated with an asset identifier 84 and network assets that are not associated with an asset identifier 84.

Patch cords 38 may include an asset identifier 84 proximate to each connector 96, 100 and one or more asset identifiers 84 along the length of the patch cord 38. Asset identifiers 84 proximate to the connectors 96, 100 may facilitate identification of the patch cord 38 connected to a port 36 by the machine vision system 86. Asset identifiers 84 along the length of the patch cord 38 may facilitate tracing the path of the patch cord 38 between racks 28 by the machine vision system 86. Tracing the path of the patch cord 38 also effectively traces a physical pathway in the data center 10, which may be displayed to a user using the display 112.

Figure 11A:
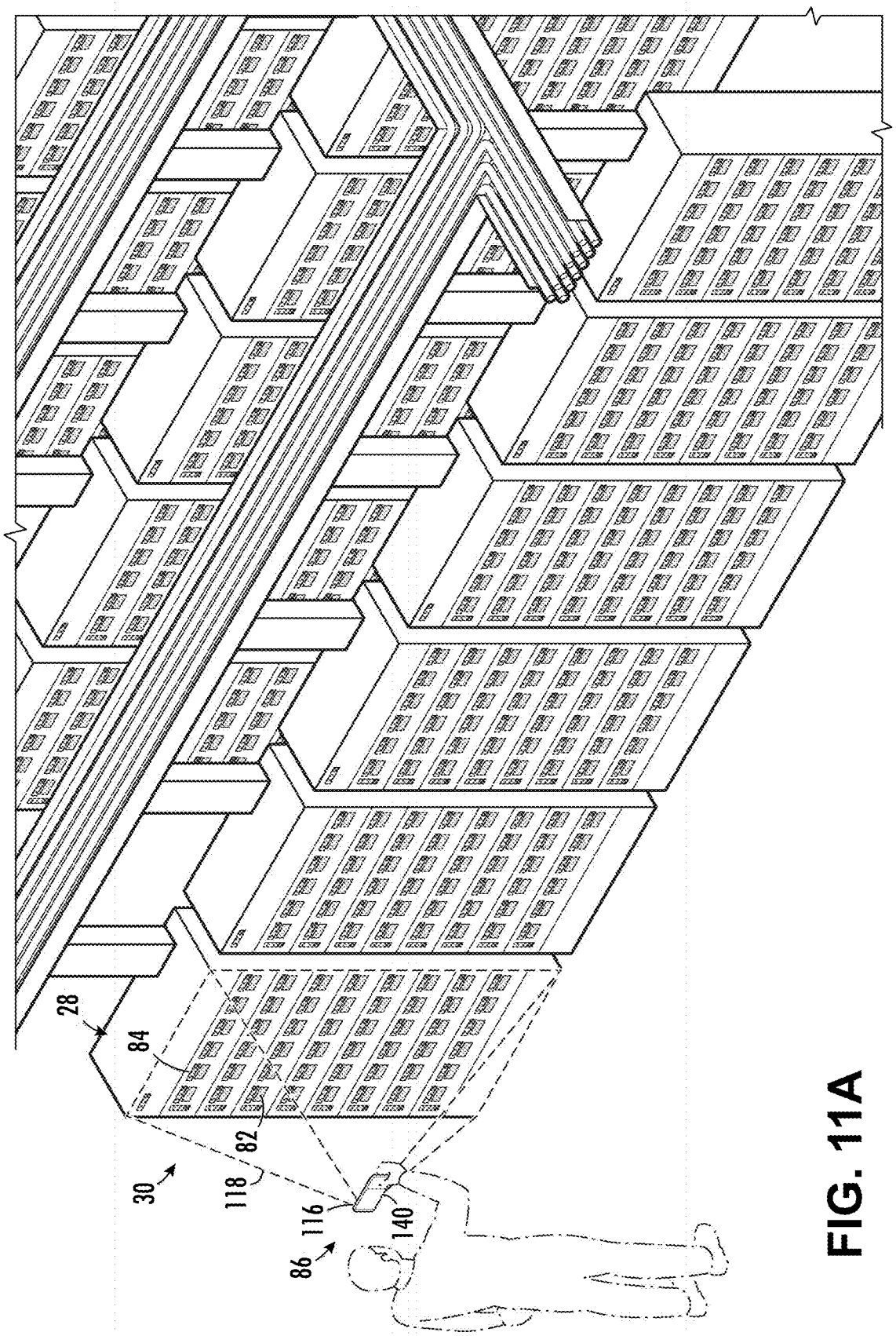
FIG. 11A is a view of a user using a machine vision system to capture an image of a network asset in accordance with an embodiment of the disclosure.

FIG. 11A depicts a typical operating environment for the machine vision system 86 in accordance with embodiment of the disclosure. In the depicted embodiment, the machine vision system 86 (e.g., a smartphone 140) is being used by a technician to document connectivity of a rack 28 in a row 30 of racks 28, such as might be found in a data center 10. The camera 116 of machine vision system 86 may have a field of view 118 such that the images captured by the camera 116 cover the rack 28 when the machine vision system 86 is held a predetermined distance (e.g., two meters) from the rack 28. The camera 116 of machine vision system 86 may include a zoom feature that allows the user or the database system 88 to adjust the field of view 118 so that it captures an area of interest by increasing the field of view (to include additional network assets 82 and asset identifiers 84) or decreasing the field of view (to capture more detail of a network asset 82 or asset identifier 84 in the field of view).

The machine vision system 86 may be used to periodically capture images of the rack 28 or other network assets 82 before, during, and after execution of a work order to identify assets 82 which are to be reconfigured, to facilitate proper reconfiguration of the assets 82 according to the work order, to validate that the work order has been executed, and to update the database system 88 so that the database records reflect the physical and network layers of the data network. As mentioned above, although shown as a hand-held device, embodiments of the machine vision system 86 may include a head mounted display, an imaging device temporarily or permanently mounted (e.g., on a tripod, wall, or cabinet frame) to view a portion of the data network, or a robot configured to execute work orders automatically. In some example embodiments, the machine vision system 86 may be mounted on an automated device, such as a roving robot or rail mounted scanner.

In an example embodiment, the machine vision system 86 may be configured to read a first asset identifier 84 associated with rack 28, housing/shelf 32, panel 34, or the like and determine a search matrix associated with the location of asset identifiers 84 associated with ports 36 or connectors 96. In the example depicted in FIG. 11B, a housing/shelf 32 is provided including three panels 34 each having 24 ports 36. The housing/shelf includes a first asset identifier 84A, the panels each include an asset identifier 84B and the ports 36 each include an asset identifier. Similarly, asset identifiers 84D may be affixed to each connector 96.

The asset identifier 84A associated with the housing/shelf 32 and/or the asset identifier 84B associated with the panels 34 may be used an "anchor label." The anchor label may identify the type of equipment and provide equipment information, including but not limited to serial, number, model number, number of panels 34, configuration or spacing of panels 34, number of ports 36, configuration of ports 36, or other suitable information. In some embodiments, the equipment information may be used to query a database to retrieve further equipment information. For example, a serial number may be used to retrieve the model number, number of panels 34, configuration or spacing of panels 34, number of ports 36, configuration of ports 36. Additionally, the query may return rack location housing/shelf location, panel location, or other information relative to a real world placement of the associated equipment. In some examples the equipment information may include a search matrix, or the configuration information associated with housing 32, panels 34, or ports 36 may be used by the machine vision system to generate a search matrix. The anchor label may be positioned at a known location on the network asset and the search matrix may include locations for each network asset, such as a port 36, relative to the anchor label. In some example embodiments the machine vision system may utilize two or more anchor labels to limit drift of the search matrix as the distance of the port locations increases from the anchor label. The machine vision system 86 may display at least a portion of the search matrix on an I/O interface for the user to move the camera about the network asset to identify asset identifiers 84. For example, the search matrix may be displayed as an augmented reality or virtual reality overlaid on an image or video of the network assets 82. The machine vision system 86 may search one or more search matrix locations to identify asset identifiers 84. The search matrix is discussed in further detail below in reference to FIGS. 11C, 11D, and 16.

Figure 12:
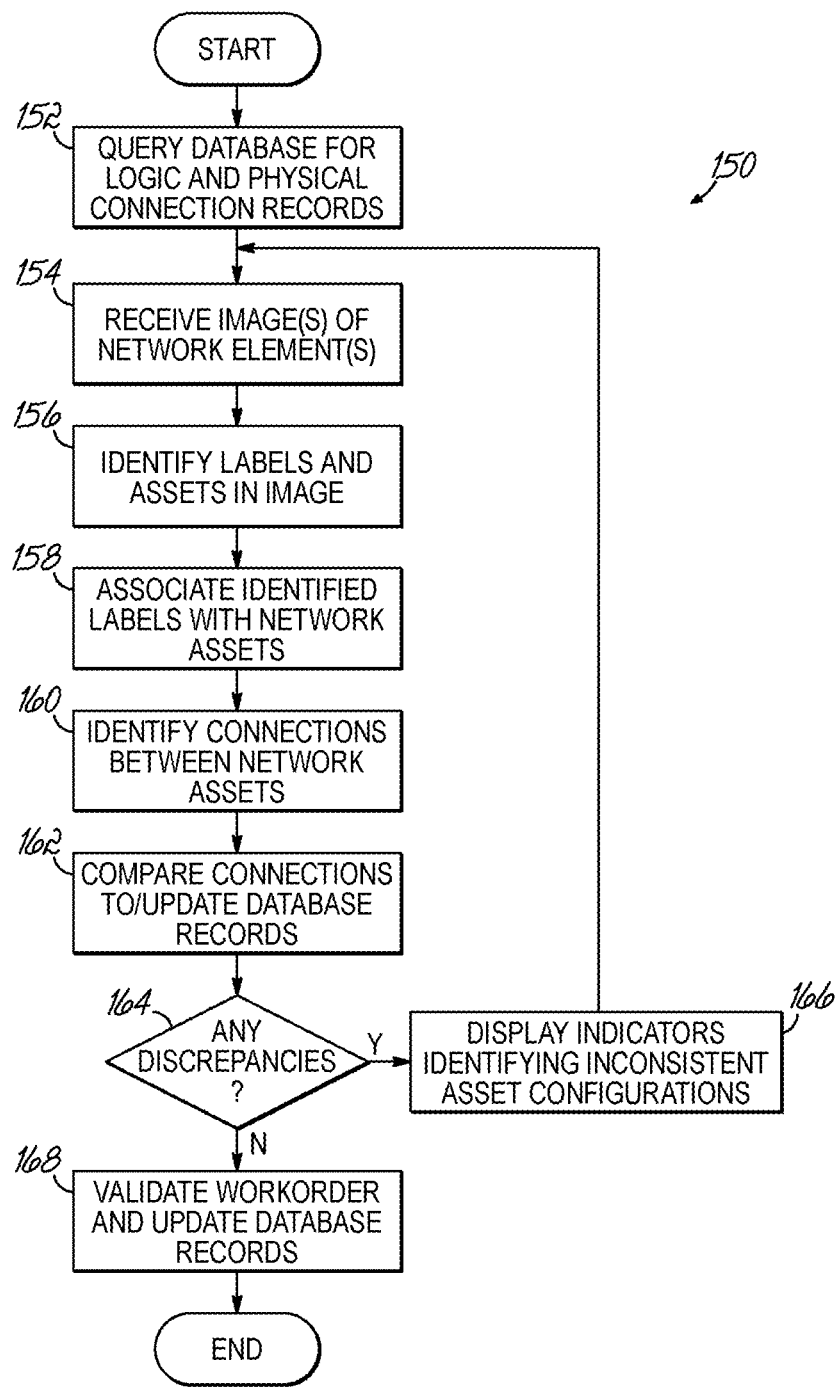
FIG. 12 is a schematic view of a flowchart depicting a process associated with carrying out a work order in accordance with an embodiment of the disclosure.

FIG. 12 depicts a flowchart illustrating a process 150 that may be executed in connection with carrying out a work order to install or update one or more network connections. The work order may be for a new greenfield installation in a data center 10, replacement of a piece of IT equipment 18, addition/deletion of a connection in a distribution point 56 of a carrier network 42, or any other action involving connecting data ports 36, 60 with a patch cord 38 or cables 68, 70. In block 152, the process 150 may query a database, such as database system 88, for information identifying logical, physical, or both logical and physical connections in the data network being serviced. This information may include existing logical and physical connections as well as new connections which are to be made according to the work order.

In cases where the work order is related to a greenfield installation, the information may be comprised mostly or entirely of network layer connections. As network assets are installed, and their physical locations and identities become known to the database system 88 based on images including the asset identifiers 84 (e.g., router V is on housing or panel W of rack X, patch cord Y runs from rack X to rack Z, etc.), the database system 88 may provide information on physical layer connections that need to be made to implement the network. In response to receiving a response to the query, the process 150 may display information to the user indicating one or more physical locations of the data network where work is to be done, e.g., information identifying one or more geographic locations (e.g., campus, central office, or distribution point), buildings, rooms, rows, racks, housings/frames/shelves, panels, ports, patch cords, and connectors. In environments in which physical location data is available, such as GPS or indoor positioning systems, these coordinates may also be used to identify the location of network assets.

In block 154, the process 150 may receive an image of a network asset 82, e.g., a rack 28 in a data center 10 or patch-panel in a distribution point 56. The image may include a plurality of network assets 82, e.g., racks 28, ports 36, connectors 96, 100, and patch cords 38, and asset identifiers 84 identifying those assets 82. The image may be captured by the camera 116 of the machine vision system 86 and may include data indicating a position and orientation of the machine vision system 86 when the image was captured. The image may also be one of a plurality of images, e.g., a video stream.

One or more network assets 82 (e.g., connectors, ports, panels, equipment, etc) and asset identifiers 84 may be within the field of view of the camera 116 in multiple images each having a different view or perspective. Multiple views may be obtained, for example, by moving the machine vision system 86 around a connector to obtain an unobstructed view, to gain different perspectives, to remove an obscuration from the field of view, or to mitigate shadows or other sources of image distortion. In a machine vision environment, more than one camera 116 (or camera views using mirrors) may be used to provide multiple perspectives simultaneously.

When multiple images of the network asset 82 are received, the process 150 may generate a three-dimensional (3-D) model of the network asset 82 based on the images, and the orientation and position of the machine vision system 86 when each image was captured. This 3-D model may facilitate identifying asset identifiers 84 and network assets 82, relative positions of identifiers 84 and network assets 82, as well as physical associations between identifiers 84 and network assets 82, and between two or more network assets 82. Physical associations between network assets 82 may include, for example, an association between a connector 96, 100 and a port 36 (e.g., the connector has a relative position or orientation indicating it is connected to the port), an association between a connector 96, 100 and a rack 28 (e.g., the connector is located in the same image as the rack), etc.

In response to receiving the image, the process 150 may proceed to block 156 and identify any asset identifiers 84 and network assets 82 that are recognized in the image. The identification of asset identifiers 84 and network assets 82 may be made using a computer vision-based object recognition algorithm, for example. In an embodiment of the disclosure, the process 150 may also transmit an interrogation signal configured to trigger a response from one or more RFID tags associated with one or more network assets 82. In cases where a network asset 82 is associated with an RFID tag (e.g., the RFID tag is embedded in or otherwise attached to the asset), the response may enable the process 150 to positively identify what network assets 82 are present. In the case of relatively large or widely spaced assets 82 (e.g., a data center rack 28 or room 26), the process 150 may be able to positively identify a network asset 82 in the image or a location of the machine vision system 86 based on data received from an RFID tag alone. Based on this information, the process 150 may be able to determine if an asset identifier 84 has been identified for each asset 82 proximate to the current location. If asset identifiers 84 have not been identified in the image for each network asset 82 present, it may indicate that missing asset identifiers 84 are obscured or outside the field of view 118 of the camera 116 of the machine vision system 86. In either case, the process 150 may alert the user to take corrective action, e.g., by capturing additional images from different vantage points.

In response to identifying the asset identifiers 84 and network assets 82 in the image, the process 150 may proceed to block 158 and associate each asset identifier 84 with a corresponding network asset 82. An asset identifier 84 may be associated with a connector 96, 100, port 36, patch cord 38, rack 28, or other network asset 82, based on a proximity of the asset identifier 84 to the network asset 82, an orientation of the asset identifier 84 relative to the asset 82 (e.g., the asset identifier is aligned with a patch cord 38), or any other suitable method. Certain network assets 82 may also be identified based on their position relative to another network asset 82. For example, ports 36 may be identified based on one or more of a position of the port 36 on a shelf 32 or panel 34 and a position of the shelf 32 or panel 34 in the rack 28.

Associating asset identifiers 84 with network assets 82 may enable the process 150 to identify assets 82 that can be used to complete the work order. For example, the process 150 may identify equipment ports 36 which are to be connected and available pre-connectorized patch cords 38 which provide a path that can be used to create a physical layer connection between two ports 36 identified in the work order. In cases such as a greenfield installation, multiple network assets 82 may be initially available to realize a physical connection that implements a desired network connection, e.g., there may be multiple patch cords 38 that run between the racks 28 in which two ports 36 which are to be connected reside. In other cases where new patch cords 38 are being installed between racks 28, the database may lack information on which network assets 82 are available to make, or that are being used to make, a physical connection until images showing the newly installed assets or physical connection are captured by the machine vision system 86.

In block 160, the process 150 may identify existing connections between network assets 82, e.g., between a connector 96, 100 terminating a patch cord 38 and a port 36 of the network asset 82. The process 150 may identify connections based on proximity and orientation of the asset identifiers 84 and network assets 82 in a similar manner as described above with regard to associating identifiers 84 with the network assets 82.

Once the asset identifiers 84, assets 82, and connections have been identified, the process 150 may proceed to block 162. In block 162, the process 150 may compare the asset identifiers 84, network assets 82, and connections with the physical layer and network layer connections for the network asset 82 indicated by the database system 88. The process 150 may also update the database records to reflect the current physical layer connections and locations of assets 82 in the data network, e.g., which connectors 96, 100 are available in which racks. If any discrepancies are detected ("YES" branch of decision block 164), the process 150 may proceed to block 166 and display indicators identifying network assets 82 (e.g., ports 36, connectors 96, 100, and patch cords 38) which are in a state inconsistent with the database records (e.g., not connected or connected to the wrong port/connector).

For a new installation, initially, there may be a large number of inconsistencies, e.g., a large number of unconnected ports 36. In contrast, for a work order involving moving a subscriber from one service to another, there may only be a few inconsistencies, e.g., one connector plugged into an incorrect port (of the old service provider) and an empty port (of the new service provider) to which the connector is to be moved. In cases where there are a large number of inconsistencies, the device may be used to capture additional images as work progresses to confirm recently made connections agree with the database records, and to indicate which connections still need to be made and which network assets 82 are available to make those connections.

In an embodiment of the disclosure, the indicators may be displayed in real time on the machine vision system 86 in a manner that positively identifies the network assets 82. These indicators may include bounded boxes that display information identifying the network asset 82 and how the asset 82 should be configured. In cases where the state of the network asset 82 is inconsistent with the database records, the indicator may have an additional characteristic (e.g., a different color or intensity) that alerts the user there may be a problem. For example, an indicator associated with a connector 96, 100 connected to a port 36 that does not match the records in the database system 88 and the port 36 to which the connector 96, 100 should be connected, may be displayed with the same distinctive color. The distinctive color may be different from all other indicators so that the user is able to immediately identify which connector 96, 100 is connected incorrectly, and the port 36 to which the connector 96, 100 should be connected.

By way of example, in response to a user selecting a network asset 82 (e.g., a port 36 or connector 96, 100), the process may uniquely identify another asset 82 (e.g., connector 96, 100 or port 36) to which the selected asset 82 should be connected. In cases where a new asset 82 is being commissioned such that only one end of a patch cord 38 is currently connected to a port 36, the indicator may indicate an incomplete connection if the other end of the selected patch cord 38 terminates in a correct location (e.g., correct rack 28 or distribution point 56), and an incorrect connection if the other end of the patch cord 38 terminates in an incorrect location. These states may be indicated by a color, such as green indicating a correct connection, yellow indicating an incomplete connection, and red indicating an incorrect connection.

The process 150 may iteratively capture images, identify asset identifiers 84 and network assets 82, and display indicators until no discrepancies (e.g., no incorrect connections) are found ("NO" branch of decision block 164). In response to no discrepancies being detected between the database records in the database system 88 and the connections at the location being serviced, the process 150 may proceed to block 168, validate the work order, and update the database records in the database system 88 to indicate the work order has been completed. In cases where certain connections are incomplete (e.g., the far end of one or more connections has yet to be made), validation of the connections may not occur until the far end connection has been completed.

Advantageously, updating the database system 88 based on an image of the completed work order at one location (location A) may enable the system to identify which assets should be connected at another location (location B) in the network. For example, the database system 88 may allow the machine vision system 86 to identify the location of the connector 96, 100 at the far end of a patch cord 38 which has been connected a port 36 in the rack 28 at one location. The user may then be instructed to proceed to location B (e.g., another rack 28 in the same room, a different room, or a different building), and capture an image of the network asset 82 to identify the connector 96, 100 and port 36 to be connected. The user may also notify another user at location B that the end of the patch cord 38 at location A has been connected so that the technician at location B can proceed to make the proper connections on their end. These connections may be made based on updated database records downloaded from the database system 88. The system 80 may thereby assist in executing the work order as well as validate that the work order has been completed properly.

Figure 13:
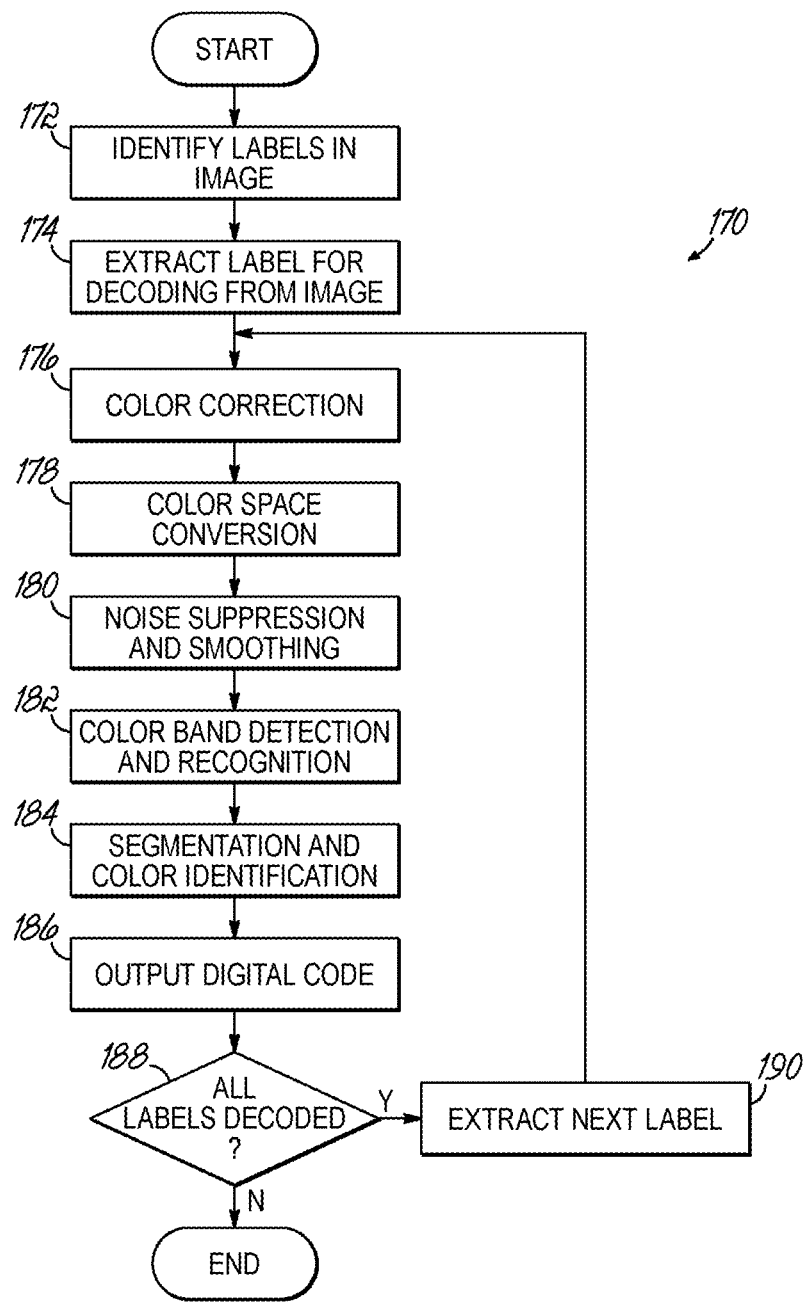
FIG. 13 is a schematic view of a flowchart depicting a process for decoding asset identifiers in accordance with an embodiment of the disclosure.

FIG. 13 depicts a flowchart illustrating a process 170 that may be executed in connection with decoding asset identifiers 84 in an image. In block 172, the process 170 may identify one or more asset identifiers 84 in an image, e.g., using object recognition. For example, the process 170 may have one or more object models corresponding to potential images of asset identifiers 84 that could appear in an image. Portions of the image may be compared to the object models, and candidate objects selected based on this comparison. The candidate objects may then be further analyzed to determine if an identifier 84 is present, and if so, the object identified as an asset identifier 84.

Once the asset identifiers 84 have been identified, the process 170 may proceed to block 174 and extract an identifier 84 from the image for decoding. Extraction may include identifying an area of the image in which the asset identifier 84 is present, referred to hereafter as the asset identifier area, and processing just those pixels comprising the asset identifier area to decode the asset identifier 84.

In block 176, the process 170 may apply a color correction to the extracted label. To facilitate color correction, each asset identifier 84 may include a color key placed at a pre-determined location on the asset identifier 84, e.g., the beginning or end of sequence of colored rings. The color key may have a neutral color (e.g., white or gray) that is not used in any other part of the asset identifier 84. The color key may thereby provide both a reference color for color correction, and a directional key to indicate which direction the asset identifier 84 should be sequenced for decoding. Color correction may also be performed on the full image using a known color reference target. The target may only need to appear in the frame periodically. For example, a gray or red-green-blue (RGB) color reference could be provided on the equipment frame.

For imaging devices that use a RGB color filter array, the color correction may amplify or attenuate each primary color channel in the asset identifier area until each primary color in the header has an appropriate (e.g., equal) amplitude. For example, for a 24-bit color density, a hexadecimal value of FFFF in a color channel may indicate full saturation of the color, and a hexadecimal value of 0000 may indicate no color present in the channel. In this example, the level of each primary color may be adjusted to have a hexadecimal value near the middle of this range, e.g., 8000. Color correction may thereby account for differences in lighting that could otherwise increase the likelihood of a decoding error.

Once the asset identifier area has been color corrected, the process 170 may proceed to block 178 and convert the asset identifier area from a native color space (e.g., RGB) to a color space which is more suitable for processing (e.g., hue, saturation, lightness (HSL), hue, saturation, value (HSV), YCbCr, etc.). The color space to which the asset identifier area converted may be selected to maximize the color difference among the set of colors used for the color bands 102 in the machine-readable digital label 90, for example.

In block 180, the process 170 may apply noise suppression and smoothing to the asset identifier area. This may include convolving the asset identifier area with a mask that produces a low-pass smoothing operation, anisotropic diffusion, outlier pixel identification and removal, or any other suitable noise suppression or smoothing algorithms. Background noise suppression using a smoothing and thresholding technique may improve the robustness of decoding the asset identifier 84.

The process 170 may then proceed to block 182 and detect and recognize the color bands 102 in the machine-readable digital label 90. Color band detection/recognition may include comparing the color value of each pixel in the asset identifier area to known color values which are used in the color-coding scheme. These values may correspond to a primary color (red, green, blue), or a combination of two primary colors (e.g., yellow, cyan, magenta). Pixels within a threshold range of one of these colors may be classified as potentially belonging to a particular color band 102. From here, the color masks for colors of interest may be constructed. Moreover, positions and color composition of asset identifiers 84 in the image may then be recognized.

In block 184, the process 170 may segment the asset identifier 84 into individual color bands 102, and the color in each band 102 may be identified. Segmentation may include determining an orientation of the asset identifier 84 in the asset identifier area and dividing the asset identifier 84 into equal segments along its length. The color of each segment may then be compared to each of the coding colors (e.g., red, green, blue, yellow, cyan, magenta), and the coding color closest to the segment color selected. A color value for each color band in the asset identifier 84 is extracted for the identification of color bands 102. The order of color may then be passed, for example, to a dictionary of lookup tables.

Once the coding color of each segment has been determined, the process 170 may proceed to block 186, and output the digital code corresponding to the sequence of color codes read from identifier area. In the above example in which there are six color codes, the digital code may be a sequence of numbers between 0 and 5, with the number of digits in the sequence equal to the number of color bands in the label. A final output for the final decoded asset identifier value is displayed in any form of user interface. For example, the asset identifier value may be displayed on the handset while the connector is in the field of view, overlaid on the image in real time, or overlaid on a context image in an augmented reality environment.

In block 188, the process 170 may determine if all the asset identifiers 84 detected in the image have been decoded. If all the asset identifiers 84 have not been decoded ("NO" branch of decision block 188), the process may proceed to block 190, select the next asset identifier 84 to decode, and return to block 176. If all the asset identifiers 84 have been decoded ("YES" branch of decision block 188, the process 170 may terminate.

It may be desirable for asset identifier detection and decoding to be effective over many viewpoints and in challenging ambient conditions (e.g., variable lighting, color temperatures and crowded, congested spaces). Advantageously, an application that implements the processes depicted in FIGS. 12 and 13 may reside in any device including a camera 116 and a processor (e.g. a smart phone, tablet, or other machine vision system) configured to capture images for processing in real-time. The use of a camera 116 to capture images using ambient light avoids the need for specialized readers that use laser light or other source of radiation such as a conventional barcode scanner, RFID reader, NFC reader, or other specialized circuitry in the reader or embedded in the network asset.

It should be recognized, however, that in an alternative embodiment, the machine vision system 86 may include a source of electromagnetic energy, such as a flash, LED, or other light source that supplements ambient light or radio frequency (RF) signals that selectively stimulate a response by the asset identifier 84. Other optional features may include an optical filter or supplemental reader to detect signals or increase the accuracy resolution of the decoding process.

In order to track connectivity from the asset identifiers 84, the computer 110 will generally have to determine spatial information that includes the endpoints of the patch cords 38 or other components and the path of the component between the two endpoints. This information can be used to integrate the information available between multiple views (as required to overcome obstruction) to increase the accuracy and completeness of identifying the ends of the patch cord 38, to determine the proximity of these ends to other components, and to determine which ends belong to the same patch cord 38 as well as the spatial route of that patch cord 38.

Figure 14:
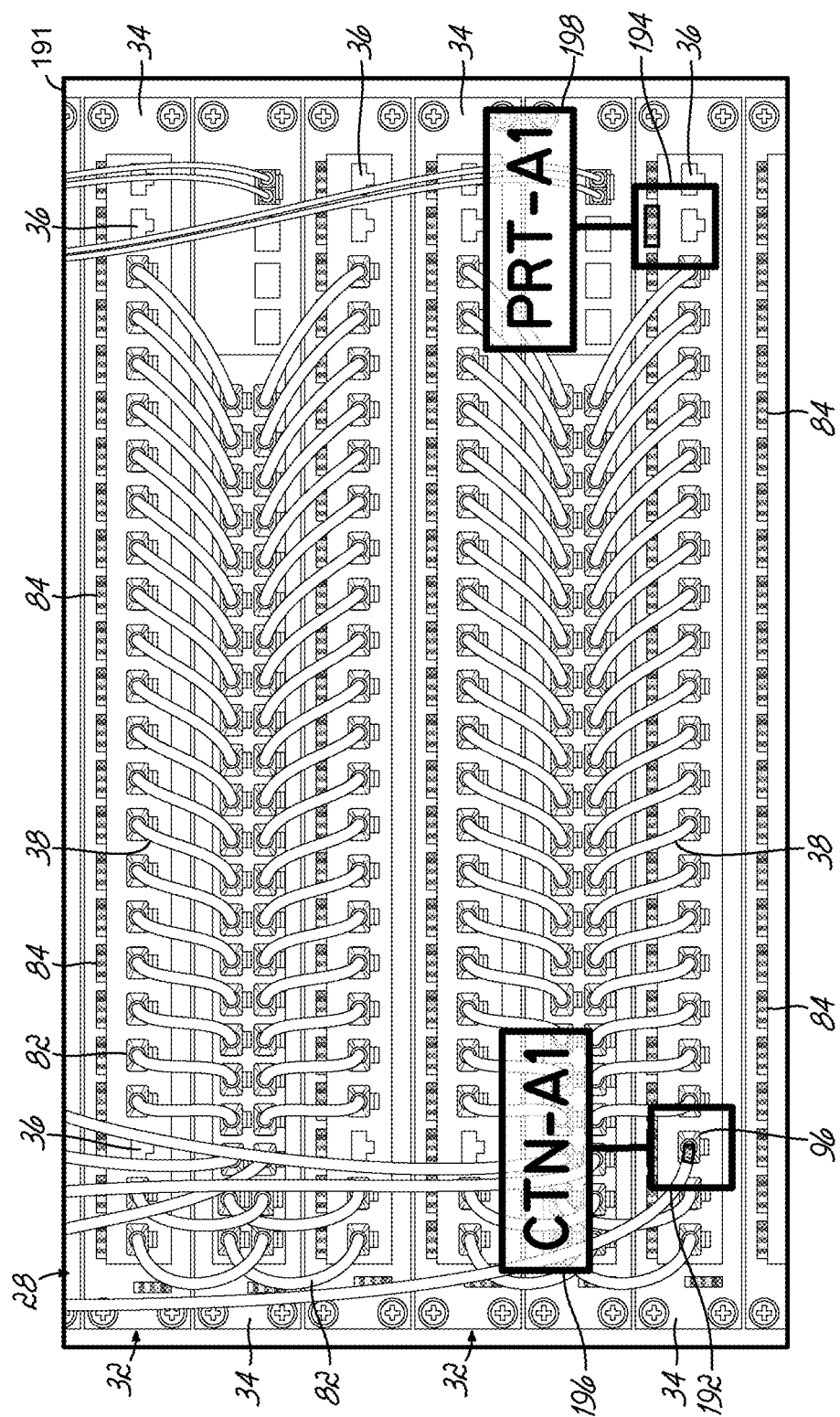
FIG. 14 is a schematic view of an augmented reality display in accordance with an embodiment of the disclosure.

FIG. 14 depicts an exemplary view 191 including network assets 82 as it may appear when viewed through a machine vision system 86 including an augmented reality feature. To support the augmented reality feature, the machine vision system 86 may include a head mounted display with a front facing camera 116. The head mounted display may include a see-through screen integrated into glasses or goggles that may be worn by the user. The machine vision system 86 may project virtual images onto the see-through screen or, for systems lacking the head mounted display, may add the images to a real-time video display. The augmented reality feature may be non-marker based (e.g., user activated) or marker based. For marker-based systems, the augmented reality feature may be activated in response to the machine vision system 86 detecting an asset identifier 84 within the camera's field of view 118.

The augmented reality feature may include one or more of head tracking, eye tracking, and hand tracking features. Head and eye tracking features may enable the machine vision system 86 to determine where the user is looking, and display information accordingly. For example, the machine vision system 86 may display a bounded box around the asset identifier 84 or network asset 82, and a text box linked to the bounded box including information associated with the asset identifier 84 or asset 82 at which the user is looking. Hand tracking may allow the user to engage the machine vision system 86 by making hand gestures in the camera's field of view 118. By way of example, tapping on an area of the image occupied by a network asset 82 or asset identifier 84 may trigger the machine vision system 86 to display information relating to the network asset 82.

In the exemplary view of FIG. 14, the network assets 82 in the field of view 118 include a portion of a rack 28, a plurality of panels 34 in the rack 28, a plurality of ports 36, and a plurality of patch cords 38. Based on asset identifiers 84 proximate to a patch cord connector 96, the machine vision system 86 has added one virtual object 192 to a display, e.g., a bounded box around the connector 96. Based on another asset identifier 84, the machine vision system 86 has added another virtual object 194 to the display, e.g., a bounded box around a port 36 into which the connector 96 is to be connected. The machine vision system 86 may thereby identify network assets 96, 36 that are to be connected.

The machine vision system 86 may also add additional virtual objects 196, 198 to the display, e.g., respective information boxes. These virtual objects 196, 198 may be linked to the virtual objects 192, 194 identifying the network assets 96, 36 to provide information related to the respective network assets 96, 36, e.g., information indicating that the connector 96 should be connected to the port 36. The virtual objects 192, 194, 196, 198 may be persistent and pop into and out of view as the camera's field of view 118 moves such that the network asset 82 associated with the virtual objects 192, 194 moves in and out of the field of view 118.

Figure 15:
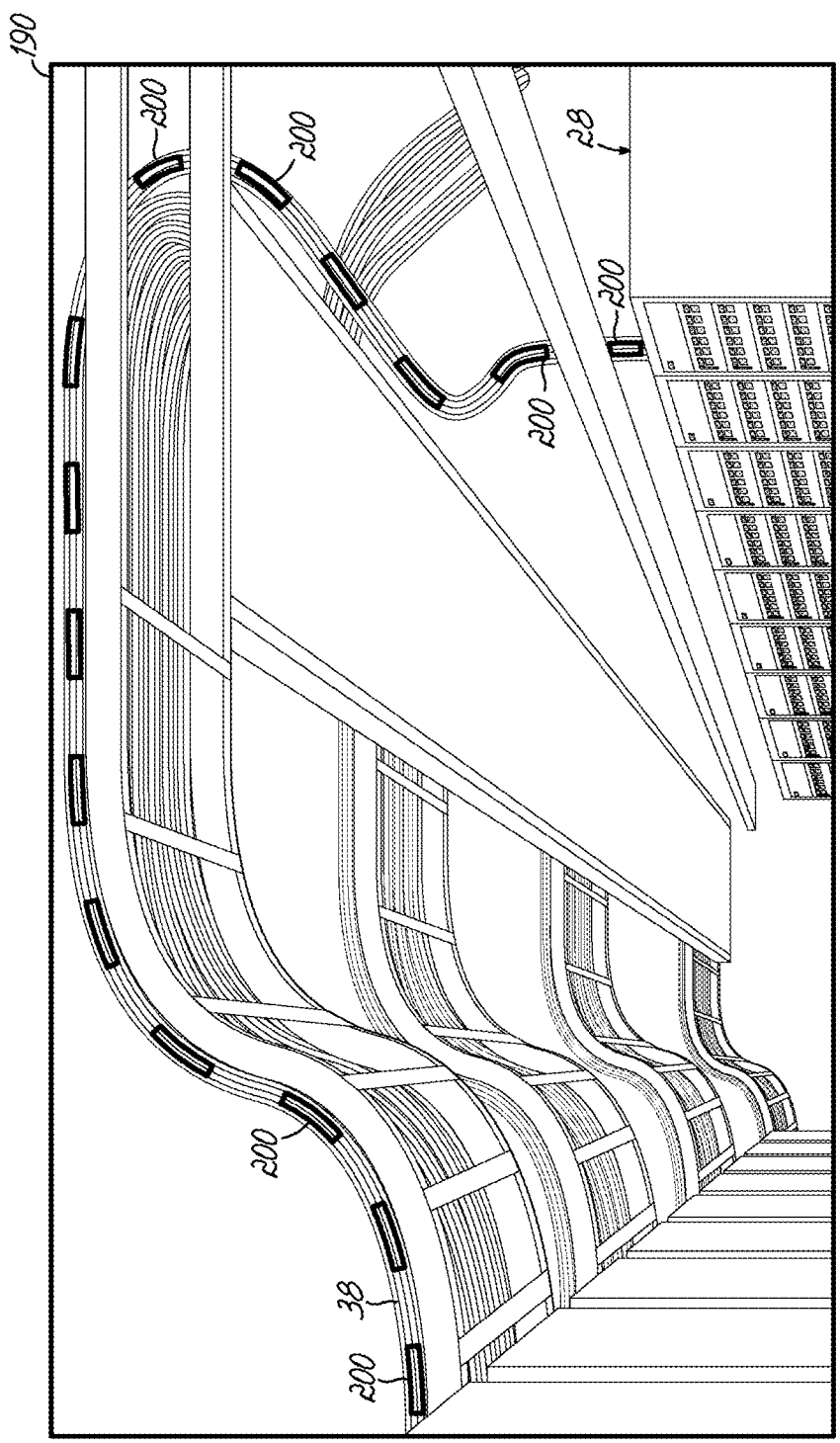
FIG. 15 is a schematic view of an augmented reality display in accordance with another embodiment of the disclosure.

Referring now to FIG. 15, the machine vision system 86 may indicate the location of the patch cord 38 associated with the work order outside of the rack 28, e.g., using one or more bounded boxes 200 (depicted), by highlighting the patch cord 38, or any other suitable means. This indication may positively identify the path the patch cord 38 takes to the rack 28 at the terminal end of the patch cord 38 being used to execute the work order. The bounded boxes 200 may be located based on detection of one or more asset identifiers 84 located along the length of the patch cord 38. The path may also be determined based on known location of the terminal connector 96, 100 of the patch cord 38, e.g., based on data extracted from an image of the rack 28 at which the patch cord 38 terminates and stored in the database system 88 at the time the patch cord 38 was installed. Once at the terminating rack 28, the machine vision system 86 may identify the connector 100 and port 36 in a manner similar to that discussed above with respect to FIG. 14. The persistence feature may thereby facilitate the user identifying the correct connector 100 and port 36 at a proximal end of a patch cord 38, follow the patch cord to the rack at which the patch cord terminates, and then identify the terminal connector 100 and port 36.

Figure 11B:
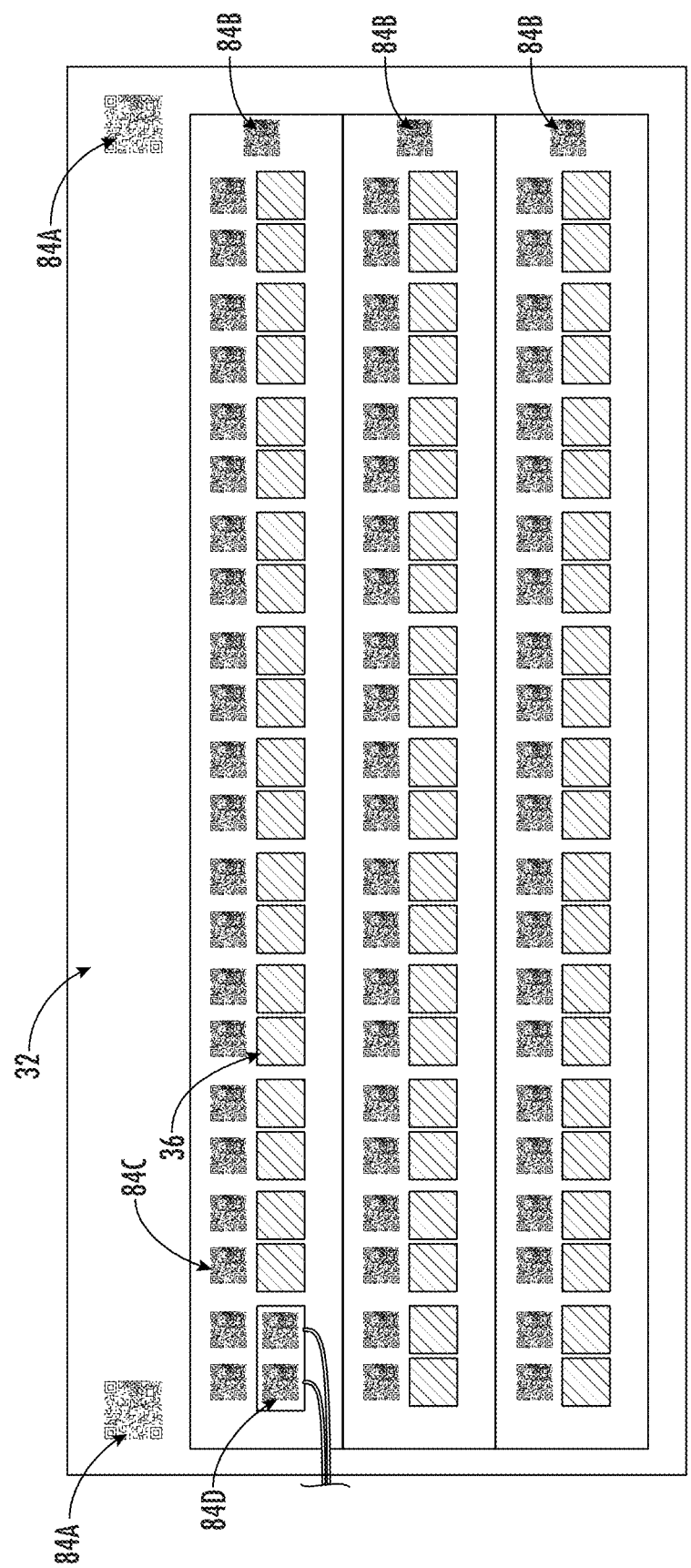
FIG. 11B is a view of the captured image of FIG. 11A in accordance with an example embodiment.
Figure 11C:
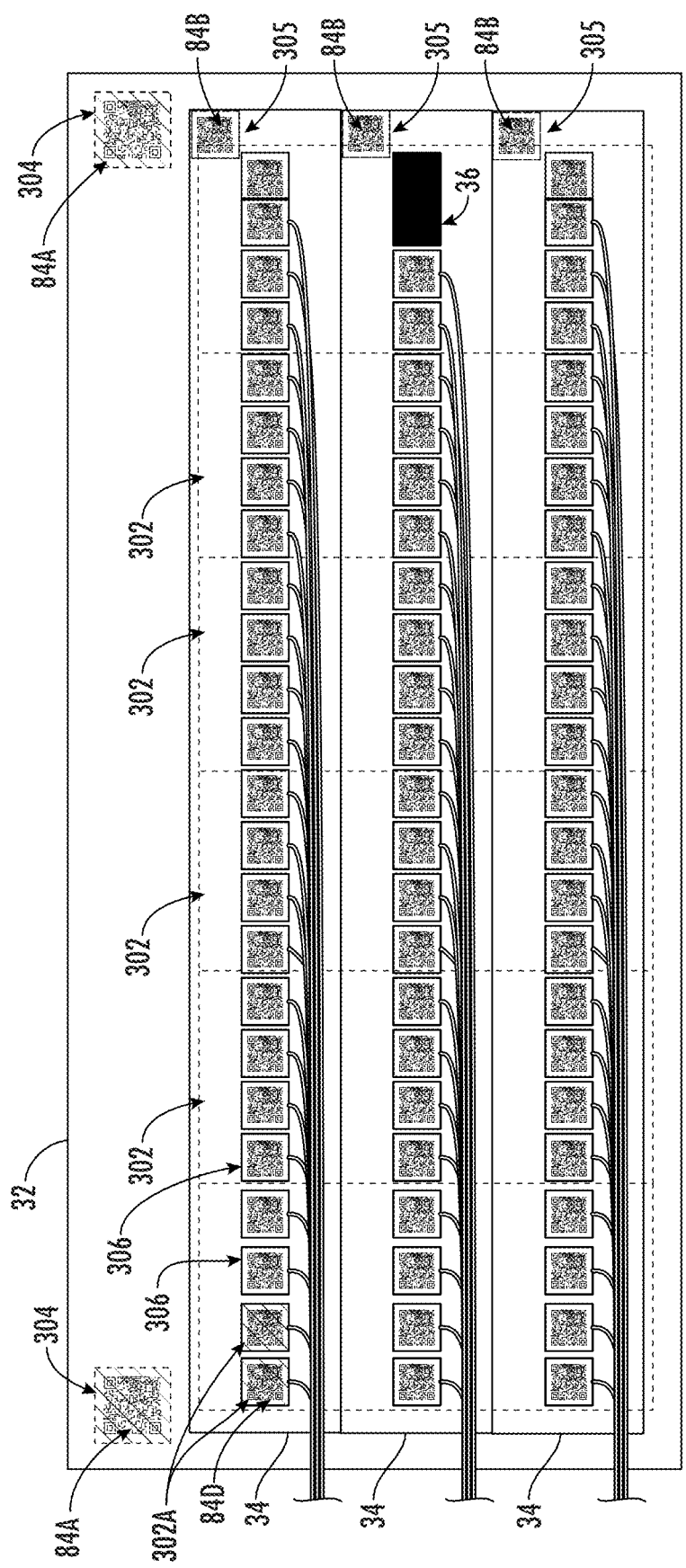
FIG. 11C is a view of the captured image including a search matrix in accordance with an example embodiment.
Figure 16:
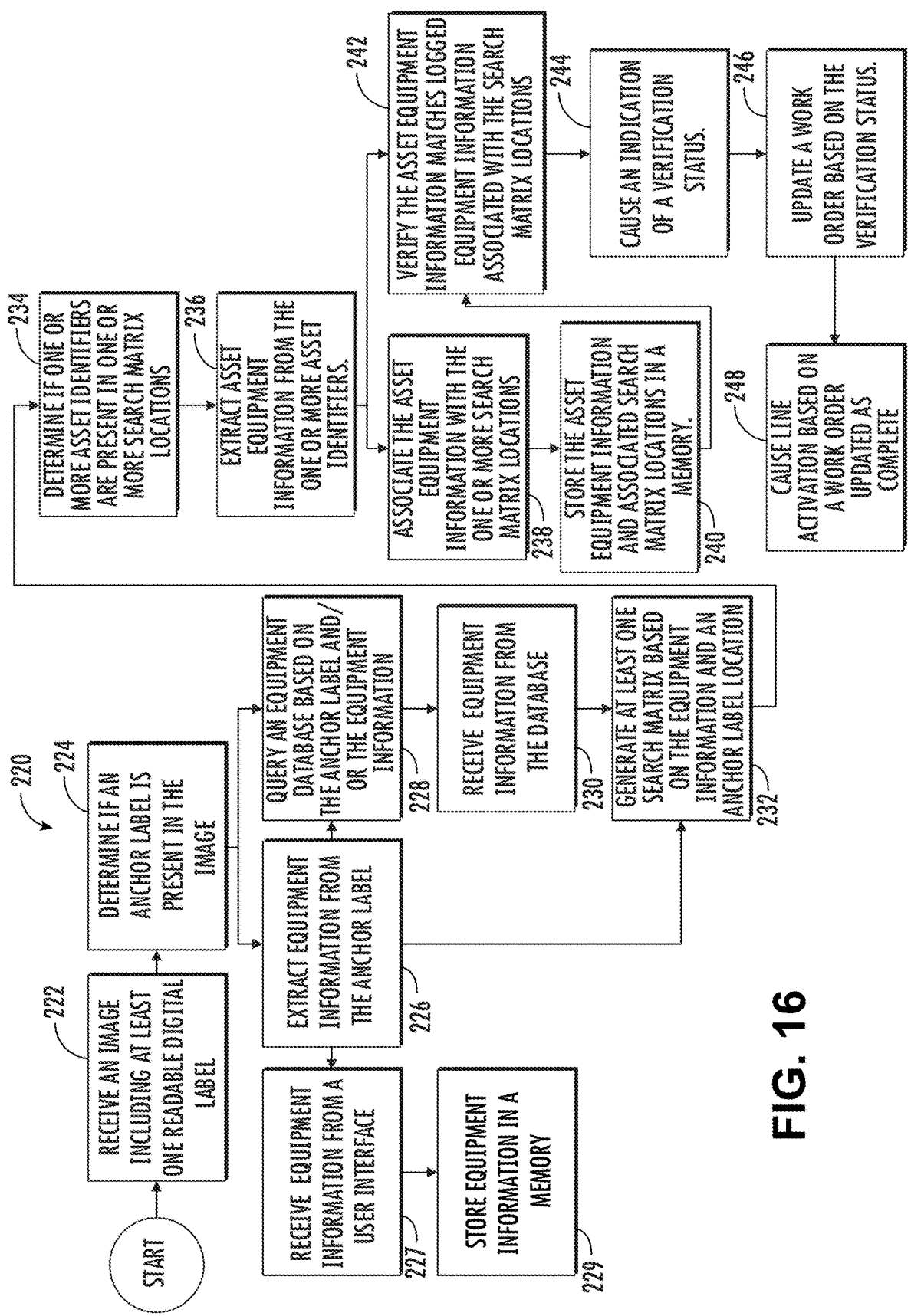
FIG. 16 is a schematic view of a flowchart depicting a process of verifying network assets using an anchor label and search matrix. in accordance with another example embodiment of the disclosure.

Turning to FIG. 16 and referring to FIGS. 11B and 11C, an anchor label and search matrix process is provided in process 220. At block 222, the process 220 may receive an image of a network asset 82, e.g., a rack 28 in a data center 10 or patch-panel in a distribution point 56. The image may include a plurality of network assets 82, e.g., racks 28, ports 36, connectors 96, 100, and patch cords 38, and asset identifiers 84 identifying those assets 82.

The image may be captured by the camera 116 of the machine vision system 86 and may include data indicating a position and orientation of the machine vision system 86 when the image was captured. The image may also be one of a plurality of images, e.g., a video stream.

One or more network assets 82 (e.g., connectors and ports) and asset identifiers 84 may be within the field of view of the camera 116 in multiple images each having a different view or perspective. Multiple views may be obtained, for example, by moving the machine vision system 86 around a connector to obtain an unobstructed view, to gain different perspectives, to remove an obscuration from the field of view, or to mitigate shadows or other sources of image distortion. In a machine vision environment, more than one camera 116 (or camera views using mirrors) may be used to provide multiple perspectives simultaneously.

When multiple images of the network asset 82 are received, the process 150 may generate a three-dimensional (3-D) model of the network asset 82 based on the images, and the orientation and position of the machine vision system 86 when each image was captured. This 3-D model may facilitate identifying asset identifiers 84 and network assets 82, relative positions of identifiers 84 and network assets 82, as well as physical associations between identifiers 84 and network assets 82, and between two or more network assets 82. Physical associations between network assets 82 may include, for example, an association between a connector 96, 100 and a port 36 (e.g., the connector has a relative position or orientation indicating it is connected to the port), an association between a connector 96, 100 and a rack 28 (e.g., the connector is located in the same image as the rack), etc.

In response to receiving the image, the process 220 may proceed to block 224 and determine if an anchor label is present in the image. As discussed above in reference to FIG. 11B, an anchor label may be an asset identifiers 84 associated with a rack 28, housing/shelf 32, or panel 34. The identification of anchor labels may be made using a computer vision-based object recognition algorithm, for example. In an embodiment of the disclosure, the anchor labels may include a predetermined value identifying them as an anchor label to the machine vision system 86 and/or may include equipment information identifying a rack 28, housing/shelf 32, or panel 34, or the like. In some instances an asset identifier 84 may be utilized as both an anchor label for subcomponents and as a generic identification label when the equipment is a subcomponent of a larger structure. For example, in FIG. 11C the housing 32 includes two housing anchor labels 84A disposed at each upper corner and a panel anchor label 84B disposed at the right upper corner of each of three panels 34. Here the anchor labels 84B associated with the panels 34 are utilized as anchor labels with regard to the asset identifiers 84D associated with the connectors 96 and as asset identifiers to the anchor label 84A associated with the housing 32.

Moving on to block 226, the process 220 may extract equipment information from the anchor label 84A, 84B. The equipment information may include serial, number, model number, number of panels 34, configuration or spacing of panels 34, number of ports 36, configuration of ports 36, or other suitable information. In some embodiments, the equipment information may be used to query an equipment database, at block 228, to retrieve further equipment information. For example, a serial number may be used to receive, at block 230, the model number, number of panels 34, configuration or spacing of panels 34, number of ports 36, configuration of ports 36. Additionally, the query may return rack location housing/shelf location, panel location, or other information relative to a real world placement of the associated equipment.

Additionally or alternatively, after extracting equipment information anchor label 84A, 84B a user may enter additional equipment information utilizing the I/O interface 126 at block 227. The user may identify the model number, number of panels 34, configuration or spacing of panels 34, number of ports 36, configuration of ports 36 rack location housing/shelf location, panel location, or the like. The additional equipment information may then be stored in a memory, such as the equipment database, for later recall, used, and verification, at block 229.

At block 232, the process may generate at least one search matrix based on the equipment information and the location of at least one anchor label 84A, 84B. As depicted in FIG. 11C, each search matrix 302 may include one or more search matrix locations, e.g. bounding areas 306 or boxes offset from the anchor label 84A, 84B. Each of the bounding boxes 306 may define an area in which a network asset 82 is likely to be located, such as a port 36 and/or connector 96, panel 34, housing/shelf 32, or the like. More particularly, the bounding boxes 306 define target locations for the machine vision system 86 to search for an asset identifier. In some example embodiment, the search matrix 302 may include the full area of a rack 28, housing/shelf 32, panel 34, or the like. In other example embodiments, the search area may include a row or column associate with one or more racks 28, housings/shelves 32, panels 34, or the like. In the depicted embodiment, the search matrix 302 includes bounding boxes extending across three panels 34 in a column and including four connector 96 or port 36 locations on each panel 34. The search matrix 302 and bounding boxes 306 may be displayed on the I/O interface 126, such as an augmented reality overlay. The user may move the camera 116 about the network assets 82 to verify the network assets 82, as described below. In some embodiments, the search matrixes 302 may utilize multiple anchor labels 84A, 84B to limit drift of the bounding boxes 306 as the distance from the anchor label 84A, 84B increases. For example, the search matrixes 302 may utilize both anchor labels 84A associated with the housing/shelf 32 to prevent drift of bounding boxes farther from one corner or the other of the housing/shelf 32. Additionally or alternatively, the anchor labels 84B associated with the panels 34 may also be utilized as the primary anchor label or to limit drift. Similar to the bounding boxes utilized for connectors 96 or ports 36, bounding boxes 305 may also be utilized for panel 34 locations, or other equipment.

Once the search matrix 302 is generated, the search matrix 302 may be persistent, e.g. utilized and/or displayed regardless of whether the anchor label 84A, 84B is within the image. The machine vision system 86 may utilize one or more sensors, such as microelectromechanical system (MEMS) sensors, to determine relative movement of the camera in reference to the one or more racks 28, housings/shelves 32, panels 34, anchor labels 84A, 84B, or the like. The relative movement of the camera 116 may, in turn, be used to determine the placement of the search matrix. Additionally or alternatively, the machine vision system 86 may compute position relationship between multiple images that one or more points, or objects, in common. For example, the machine vision system 86 may utilize Visual-Inertial Odometry (VIO) algorithms, Simultaneous Location and Mapping (SLAM) algorithms, or other suitable methods.

At block 234, the process 220 may determine if one or more asset identifiers are present in one or more of the search matrix locations, e.g. bounding boxes 306, 305. The machine vision system 86 may search the image within the bounding boxes 306, 305 to locate an asset identifier 84. In some example embodiments, the machine vision system may identify an asset identifier 84 using only a portion of the label 90, such as redundant coded labels. In some case the machine vision system 86 may also search the area around the bounding box 306, 305, such as plus or minus 2 mm, or other suitable drift area field. In an example embodiment, the machine vision system 86 may be configured to identify a portion of an asset identifier 84 within the bounding box and search the surrounding area to locate the remaining portion of the asset identifier 84.

At block 236, the process 220 may extract asset equipment information from the one or more asset identifiers 84. The equipment information may include, without limitation, a serial number, a model number, or other suitable information.

At block 238, the process 220 may associate the asset equipment information with the one or more search matrix locations. At block 240, the process 220 may store the asset equipment identification and associated search matrix location in a memory, such as the equipment database. Additionally, in some embodiments, the process may also associate the asset equipment information with other network assets 82, such as proximate network assets, which may be used to validate the asset location in the network or search matrix 202. Additionally, the asset equipment information may be associated with larger structural units of the network. For example, the asset equipment information associated with a connector may be associated with a panel 34, housing/shelf 32, rack 28, network location, and/or other suitable network assets. In some example embodiments, a user may enter additional equipment information utilizing the I/O interface 126, which may also be associated with the asset equipment information.

If blocks 238 and 240 had been previously performed, the process 220 may proceed from block 236 to block 242. At block 242, the process may verify the asset equipment information matches logged equipment information associated with the search location. The asset equipment information may be compared extracted at block 236 may be compared to at least a portion, such as a serial number, of the asset equipment information stored in association with the search matrix location. At block 224, the process may cause an indication of the verification status, such as highlighting the search matrix location in green if the verification is a match or red is the verification is not a match. In an example embodiments, the search matrix locations may be outlined, but not filled until the verification has been completed. Turning back to FIG. 11C, the asset equipment information for the first two asset identifiers 84D associated with connectors 96 (not shown) have been verified, as indicated by the shading, whereas the remaining asset identifiers associated with connectors 96 have not yet been verified. Additionally, anchor labels 84A have also been read and verified by the process, however, the anchor labels 84B associated with the panels 34 have not yet been verified. The user, may move the camera of the machine vision system 86 in front of the rack 28, housing/shelf 32, or the like until the each of the network assets 82 have been verified. In some examples, 144, 288, or 576 connector port locations or associated connectors 96 may be read in as little as 30 seconds.

In some example embodiments, the process 220 may update a work order based on the verification status, at block 246. The process for updating work orders is described above in reference to process 150.

At block 248, the process 220 may cause a communication line activation based on a workorder updated as complete. In an example in which, the work order is directed toward installation or repair of a subscriber line or distribution line, or the like, or other suitable work order, the completion of the work order may be indicative of the communication line being available for data communication. The process may communicate to the network the status of the work order and/or the status of the communication line to cause the network to commence transmitting and receiving on the communication line.

Figure 17:
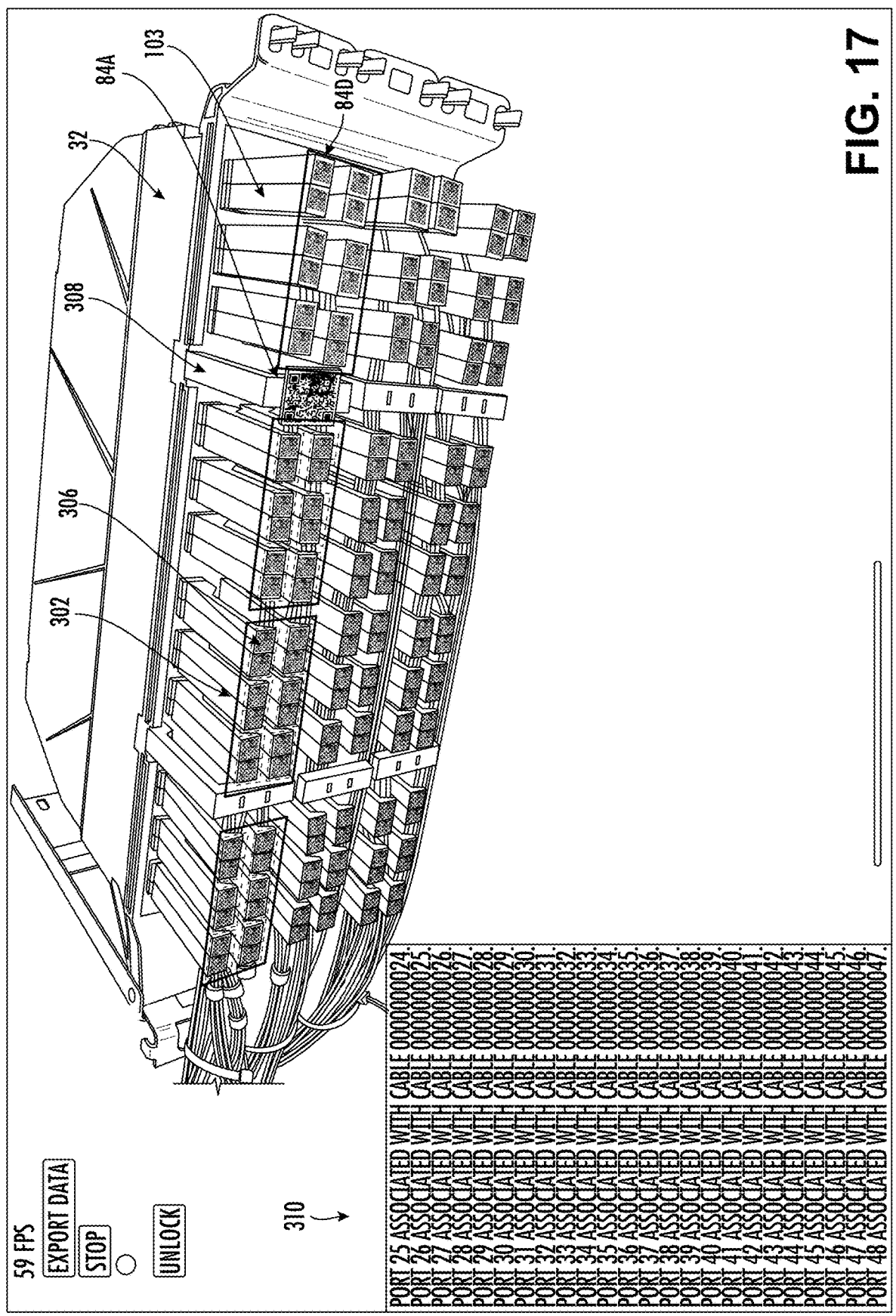
FIG. 17 illustrates an image captured by a machine vision system during verification of a network assets in accordance with an embodiment of the disclosure.

FIG. 17 illustrates an image captured by the machine vision system 86 during verification of network assets, such as during process 220. A housing 32 is populated by a plurality of connectors 96 (not shown), each having a label carrier 103 and an asset identifier 84D. In this example, the housing 32 also includes a label carrier 308 extending from a front face of the housing 32. The asset identifier or anchor label 84A associated with the housing is disposed on the label carrier 308, such that the asset identifier 84A associated with the housing 32 are substantially coplanar with the asset identifiers 84D of the connectors. Having the asset identifiers disposed coplanar may reduce search matrix location errors and or drift. The anchor label 84A has been read and used to generate a plurality of search matrixes 302 on a first of three rows in the housing 32. In the depicted example, the search matrixes 302 each include twelve bounding boxes 306 arranged in two rows of six. Each of the bounding boxes 306 has been associated and verified as indicated by the highlighting of the bounding box.

Additionally, a process text box 310 is presented in the lower left corner. Here the process text box 310 includes port number to cable serial number associations. However, other process steps may also be indicated.

In some examples the equipment information may include a search matrix, or the configuration information associated with housing 32, panels 34, or ports 36 may be used by the machine vision system to generate a search matrix. The search matrix may include a locations for each port 36 relative to the anchor label. In some example embodiments the machine vision system may utilize two or more anchor labels to limit drift of the search matrix as the distance of the port locations increases from the anchor label.

As described above, the machine vision system 86 may detect and segment the asset identifiers 84 (e.g., the machine-readable digital labels 90) within the field of view 118 and indicate the location of an identified asset 82 to the user using augmented reality. This detection and segmentation may enable asset identification and digital traceability of the object. One way to accomplish object detection is to use error correction and machine learning algorithms. The use of computer vision and machine learning in particular may allow the machine vision system 86 to account for large variations in the ambient environment expected in a congested data center 10, where hundreds of virtually identical connectors and patch cords are often within the field of view.

The use of machine learning may enable the machine vision system 86 to: (1) detect an individual asset 82 (e.g., connector, port, or patch cord) from a large number of similar assets in the field of view 118; (2) segment the asset identifier 84 in appropriate color spaces; and (3) decode the asset identifier 84 associated with that specific asset 82. The decoded identifier 84 can then be used for digital traceability and intelligent patching within a network environment. Object recognition may be improved over time by allowing the user to provide an indication whether the machine vision system 86 has correctly or incorrectly identified a network asset 82. The machine learning feature may then adjust a neural network or other machine learning algorithm based on this feedback from the user.

In an example embodiment, a machine vision system is provided including a camera, a processor, and a device memory including computer program code stored thereon. The computer program code is configured, when executed by the processor, to receive an image, from the camera, including at least one readable digital label associated with communication equipment, determine if an anchor label is present in the image, receive equipment information based on the anchor label, and generate a search matrix based on the equipment information and the anchor label, wherein the search matrix comprises one or more search matrix locations of assets associated with the communication equipment.

In some example embodiments, the assets comprise one or more of an equipment rack, a shelf, a panel, a port, a connector, or a cable. In an example embodiment, the computer program code is further configured to cause the processor to identify the equipment information in the anchor label. In some example embodiments, the computer program code is further configured to cause the processor to query an equipment database based on the anchor label and receive the equipment information from the database In an example embodiment, the machine vision system also includes a user interface and the computer program code is further configured to cause the processor to cause the search matrix to be displayed on the user interface overlaid on the image. In some example embodiments, the machine vision system also includes a user interface and the computer program code is further configured to cause the processor to receive additional equipment information from the user interface and cause the additional equipment information to be stored in an equipment database. In an example embodiment, the computer program code is further configured to cause the processor to determine if one or more asset identifiers are present in the search matrix locations. In some example embodiments, the computer program code is further configured to cause the processor to extract asset equipment information from the one or more asset identifiers. In an example embodiment, the computer program code is further configured to cause the processor to associate the asset equipment information with a search matrix location and cause the asset equipment information and associated search matrix location to be stored in a memory. In some example embodiments, the computer program code is further configured to cause the processor to verify the asset equipment information matches logged equipment information associated with the search matrix locations. In an example embodiment, the computer program code is further configured to cause the processor to cause an indication of a verification status to be displayed on the user interface. In some example embodiments, the computer program code is further configured to cause the processor to update a work order based on a verification status. In an example embodiment, the computer program code is further configured to cause the processor to cause a communication line activation based on the work order being updated. In some example embodiments, the search matrix is persistent.

In another example embodiment, a method of tracking assets of communication equipment is provided.

Although the above disclosure describes embodiments of the system 80 in great detail with respect to management of the physical layer of a data network, the scope of the disclosure is not so limited. For example, aspects of the system could also be used to manage laboratory equipment for chemical, biochemical, life science, or medical applications that include tubing which connects sample containers, culture vessels, reactor chambers, etc. Aspects of the system may also be used to track assets in the form of tubing, wiring, and plumbing in buildings, manufacturing plants, refineries, or any other application in which physical connections between multiple assets are used. Accordingly, aspects of the present disclosure should be limited to data network applications, but apply to a broader range of potential applications, such as power systems (with power cables), medical systems (with medical tubing or cables), or the like.

Thus, those skilled in the art will appreciate that other modifications and variations can be made without departing from the spirit or scope of the disclosure. Since modifications, combinations, sub-combinations, and variations of the disclosed embodiments incorporating the spirit and substance of the disclosure may occur to persons skilled in the art, the disclosure should be construed to include everything within the scope of the appended claims and their equivalents.

What is claimed is:

1. A machine vision system comprising:
    a camera;
    a processor; and
    a device memory including computer program code stored thereon, wherein the computer program code is configured, when executed by the processor, to:
        receive an image, from the camera, including at least one readable digital label associated with communication equipment;
        determine if an anchor label is present in the image, wherein the anchor label is disposed in association with the communication equipment;
        receive equipment information based on the anchor label;
        in response to receiving the equipment information, generate a search matrix based on the equipment information and a location of the anchor label, wherein the search matrix comprises one or more search matrix locations comprising bounding areas defining target locations of a plurality of ports disposed on the communication equipment and wherein each of the one or more search matrix locations are visually indicated at a predetermined offset from the location of the anchor label superimposed over the target locations;
        search the target locations of a plurality of ports for asset identifiers;
        determine, based on the search of the target locations of a plurality of ports, if one or more asset identifiers are present in one or more the search matrix locations, wherein the asset identifiers are disposed on one of a cable or a connector;
        associate the one or more asset identifiers with the one or more search matrix locations, such that one or more ports of the plurality of ports is associated with the cable or the connector connected thereto; and
        cause the associated one or more asset identifiers and one or more search matrix locations to be stored in a memory.

2. The machine vision system of claim 1, wherein the computer program code is further configured to cause the processor to:
    identify the equipment information in the anchor label.

3. The machine vision system of claim 1, wherein the computer program code is further configured to cause the processor to:
    query an equipment database based on the anchor label; and
    receive the equipment information from the equipment database.

4. The machine vision system of claim 1 further comprising:
    a user interface, and
    wherein the computer program code is further configured to cause the processor to:
        cause the search matrix to be displayed on the user interface overlaid on the image.

5. The machine vision system of claim 1 further comprising:
    a user interface, and
    wherein the computer program code is further configured to cause the processor to:
        receive additional equipment information from the user interface; and
        cause the additional equipment information to be stored in an equipment database.

6. The machine vision system of claim 1, wherein the computer program code is further configured to cause the processor to:
    extract asset equipment information from the one or more asset identifiers.

7. The machine vision system of claim 6, wherein the computer program code is further configured to cause the processor to:
    associate the asset equipment information with a search matrix location; and
    cause the associated asset equipment information and search matrix location to be stored in a memory.

8. The machine vision system of claim 1, wherein the computer program code is further configured to cause the processor to:
    verify an asset identifier matches a logged asset identifier associated with a search matrix location.

9. The machine vision system of claim 8 further comprising:
    a user interface, and
    wherein the computer program code is further configured to cause the processor to:
        cause an indication of a verification status to be displayed on the user interface.

10. The machine vision system of claim 8, wherein the computer program code is further configured to cause the processor to:
    update a work order based on a verification status.

11. The machine vision system of claim 10, wherein the computer program code is further configured to cause the processor to:
    cause a communication line activation based on the work order being updated.

12. The machine vision system of claim 1, wherein the search matrix is persistent.

13. A method of tracking assets of communication equipment, comprising:
    receiving an image including at least one readable digital label;
    determining, by a processor, if an anchor label is present in the image, wherein the anchor label is disposed on the communication equipment;
    extracting equipment information from the anchor label;
    in response to extracting the equipment information, generating a search matrix based on the equipment information and a location of the anchor label, wherein the search matrix comprises one or more search matrix locations comprising bounding areas defining target locations of a plurality of ports disposed on the communication equipment and wherein each of the one or more search matrix locations are visually indicated at a predetermined offset from the location of the anchor label superimposed over the target locations;
    searching the target locations of a plurality of ports for asset identifiers;
    determining, based on the searching of the target locations of a plurality of ports, if one or more asset identifiers are present in one or more the search matrix locations, wherein the asset identifiers are disposed on one of a cable or a connector;
    associating the one or more asset identifiers with the one or more search matrix locations, such that one or more ports of the plurality of ports is associated with the cable or the connector connected thereto; and causing the associated one or more asset identifiers and one or more search matrix locations to be stored in a memory.

14. The method of claim 13 further comprising:
identifying the equipment information in the anchor label.

15. The method of claim 13 further comprising:
querying an equipment database based on the anchor label; and
receiving the equipment information from the equipment database.

16. The method of claim 13 further comprising:
causing the search matrix to be displayed on a user interface overlaid on the image.

17. The method of claim 13 further comprising:
receiving additional equipment information from a user interface; and
causing the additional equipment information to be stored in an equipment database.

18. The method of claim 13 further comprising:
extracting asset equipment information from the one or more asset identifiers.

19. The method of claim 18 further comprising:
associating the asset equipment information with a search matrix location; and
causing the associated asset equipment information and search matrix location to be stored in a memory.

20. The method of claim 13 further comprising:
verifying an asset identifier matches a logged asset identifier associated with a search matrix location.

21. The method of claim 20 further comprising:
causing an indication of a verification status to be displayed on a user interface.

22. The method of claim 20 further comprising:
updating a work order based on a verification status.

23. The method of claim 22 further comprising:
causing a communication line activation based on the work order being updated.

24. The method of claim 13, wherein the search matrix is persistent.

* * * * *